United States Patent
Liu et al.

(10) Patent No.: US 7,281,072 B2
(45) Date of Patent: Oct. 9, 2007

(54) REDUNDANT EXTERNAL STORAGE VIRTUALIZATION COMPUTER SYSTEM

(75) Inventors: Ling-Yi Liu, Taipei (TW); Tse-Han Lee, Taipei (TW); Michael Gordon Schnapp, Taipei Hsien (TW); Yun-Huei Wang, Taipei Hsien (TW); Chung-Hua Pao, Taipei Hsien (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 165 days.

(21) Appl. No.: 10/708,242

(22) Filed: Feb. 18, 2004

(65) Prior Publication Data

US 2005/0005062 A1    Jan. 6, 2005

Related U.S. Application Data

(60) Provisional application No. 60/483,926, filed on Jul. 2, 2003.

(51) Int. Cl.
    *G06F 13/14*  (2006.01)
    *G06F 12/00*  (2006.01)
    *G06F 19/00*  (2006.01)

(52) U.S. Cl. .................... 710/240; 714/6; 711/114; 711/151; 711/203

(58) Field of Classification Search ............... 710/240, 710/74, 300, 316, 3, 36, 38, 314, 315, 8; 711/151, 114, 154, 203, 112, 162; 714/5, 714/6, 43; 370/351, 431, 464, 906, 910, 370/228, 386

See application file for complete search history.

(56) References Cited

U.S. PATENT DOCUMENTS

| | | | |
|---|---|---|---|
| 5,928,367 A | 7/1999 | Nelson et al. | |
| 5,987,566 A | 11/1999 | Vishlitzky | |
| 6,061,752 A * | 5/2000 | Jones et al. | 710/302 |
| 6,483,107 B1 | 11/2002 | Rabinovitz et al. | |
| 6,532,547 B1 * | 3/2003 | Wilcox | 714/5 |
| 6,961,813 B2 * | 11/2005 | Grieff et al. | 711/112 |
| 7,065,661 B2 | 6/2006 | Borsini et al. | |
| 2002/0152355 A1 | 10/2002 | Otterness | |
| 2003/0033477 A1 * | 2/2003 | Johnson et al. | 711/114 |
| 2003/0193776 A1 * | 10/2003 | Bicknell et al. | 361/685 |

(Continued)

OTHER PUBLICATIONS

"An efficient BIST method for distributed small buffers" by Jone et al. (abstract only) Publication Date: Aug. 2002.*

*Primary Examiner*—Gopal C. Ray
(74) *Attorney, Agent, or Firm*—Winston Hsu

(57) ABSTRACT

A redundant external storage virtualization computer system. The redundant storage virtualization computer system includes a host entity for issuing an IO request, a redundant external storage virtualization controller pair coupled to the host entity for performing an IO operation in response to the IO request issued by the host entity, and a plurality of physical storage devices for providing storage to the computer system. Each of the physical storage devices is coupled to the redundant storage virtualization controller pair through a point-to-point serial signal interconnect. The redundant storage virtualization controller pair includes a first and a second storage virtualization controller both coupled to the host entity. In the redundant storage virtualization controller pair, when the second storage virtualization controller is not on line, the first storage virtualization controller will take over the functionality originally performed by the second storage virtualization controller.

129 Claims, 45 Drawing Sheets

U.S. PATENT DOCUMENTS

| | | |
|---|---|---|
| 2004/0143694 A1 | 7/2004 | Chen |
| 2004/0177218 A1 | 9/2004 | Meehan |
| 2004/0210584 A1 | 10/2004 | Nir et al. |
| 2004/0260873 A1 | 12/2004 | Watanabe |
| 2005/0005044 A1* | 1/2005 | Liu et al. .................. 710/74 |
| 2005/0089027 A1 | 4/2005 | Colton |
| 2005/0120170 A1 | 6/2005 | Zhu |
| 2005/0160319 A1 | 7/2005 | Marcak et al. |
| 2005/0182887 A1 | 8/2005 | Sakurai |
| 2005/0204078 A1 | 9/2005 | Steinmetz et al. |
| 2005/0223269 A1 | 10/2005 | Stolowitz |
| 2005/0251588 A1* | 11/2005 | Hoch et al. .................. 710/5 |

* cited by examiner

| 0 | Reserved (0) | Reserved (0) | R | I | D | Reserved (0) | FIS Type (41h) |
|---|---|---|---|---|---|---|---|
| 1 | DMA buffer identifier Low ||||||||
| 2 | DMA buffer identifier High ||||||||
| 3 | Reserved (0) ||||||||
| 4 | DMA buffer offset ||||||||
| 5 | DMA transfer count ||||||||
| 6 | Reserved (0) ||||||||

Fig. 13

| 0 | Reserved (0) | Reserved (0) | R | R | R | Reserved (0) | FIS Type (46h) |

| 1 | |
| ... | N Double-words of data |
| | (minimum of one Double-word–maximum of 2048 |
| ... | Double-words) |
| n | |

Fig. 14

| CS1 | CS2 | CS | SI1->PI | SI2->PI |
|---|---|---|---|---|
| 0 | 0 | 0 | Closed | Open |
| 0 | Tri | 0 | Closed | Open |
| Tri | 0 | 0 | Closed | Open |
| Tri | Tri | 1 | Open | Closed |

Fig. 40

| CS1 | CS2 | SI1->PI | SI2->PI | Note |
|---|---|---|---|---|
| 0 | 0 | Undef | Undef | *: most recent changed one of CS1, CS2 gets access. |
| 0 | 1 | Open | Closed | |
| 1 | 0 | Closed | Open | |
| 1 | 1 | *Note | *Note | |

Fig. 41

| Loop Connections | M1 | M2 | M3 | M4 | M5 |
|---|---|---|---|---|---|
| C1<=>P1,C2<=>P2 | 0 | 0 | 0 | 0 | 0 |
| C1=>C2=>P1=>C1 | 1 | 1 | 0 | DC | DC |
| C1=>C2=>P2=>C1 | 1 | DC | 1 | 0 | 0 |
| C1<=>P1 | DC | 0 | 0 | DC | DC |
| C1<=>P2 | DC | DC | 1 | 1 | 0 |
| C2<=>P2 | 0 | DC | DC | 0 | 0 |
| C2<=>P1 | 0 | 1 | DC | DC | 1 |

Cn: SVCn, Pn: Storage Unit Port n; n=1, 2.

Fig. 42

| S1 | S2 | R1 | R2 | M1 | M2 | M3 | M4 | M5 |
|---|---|---|---|---|---|---|---|---|
| Val | Val | 0 | 0 | 0 | 0 | 0 | 0 | 0 |
| Inv | Val | 0 | 0 | 1 | 0 | 1 | 0 | 0 |
| Val | Inv | 0 | 0 | 1 | 1 | 0 | 0 | 1 |
| Val | Val | 1 | 0 | 0 | 0 | 0 | 1 | 0 |
| Inv | Val | 1 | 0 | 1 | 0 | 1 | 1 | 0 |
| Val | Inv | 1 | 0 | 1 | 0 | 0 | 1 | 1 |
| Val | Val | 0 | 1 | 0 | 0 | 0 | 0 | 0 |
| Inv | Val | 0 | 1 | 0 | 0 | 1 | 0 | 0 |
| Val | Inv | 0 | 1 | 0 | 1 | 0 | 0 | 1 |

Fig. 43

| C1 | C2 | R1 | R2 | M1 | M2 | M3 | M4 | M5 |
|---|---|---|---|---|---|---|---|---|
| 0 | 0 | 0 | 0 | 0 | 0 | 0 | 0 | 0 |
| 1 | 0 | 0 | 0 | 1 | 0 | 1 | 0 | 0 |
| 0 | 1 | 0 | 0 | 1 | 1 | 0 | 0 | 1 |
| 0 | 0 | 1 | 0 | 0 | 0 | 0 | 1 | 0 |
| 1 | 0 | 1 | 0 | 1 | 0 | 1 | 1 | 0 |
| 0 | 1 | 1 | 0 | 1 | 0 | 0 | 1 | 1 |
| 0 | 0 | 0 | 1 | 0 | 0 | 0 | 0 | 0 |
| 1 | 0 | 0 | 1 | 0 | 0 | 1 | 0 | 0 |
| 0 | 1 | 0 | 1 | 0 | 1 | 0 | 0 | 1 |

Fig. 44

| S1/C | S2/C | R1 | R2 | M1 | M2 | M3 | M4 | M5 |
|---|---|---|---|---|---|---|---|---|
| 0 | 0 | 0 | 0 | 0 | 0 | 0 | 0 | 0 |
| 1 | 0 | 0 | 0 | 1 | 0 | 1 | 0 | 0 |
| 0 | 1 | 0 | 0 | 1 | 1 | 0 | 0 | 1 |
| 0 | 0 | 1 | 0 | 0 | 0 | 0 | 1 | 0 |
| 1 | 0 | 1 | 0 | 1 | 0 | 1 | 1 | 0 |
| 0 | 1 | 1 | 0 | 1 | 0 | 0 | 1 | 1 |
| 0 | 0 | 0 | 1 | 0 | 0 | 0 | 0 | 0 |
| 1 | 0 | 0 | 1 | 0 | 0 | 1 | 0 | 0 |
| 0 | 1 | 0 | 1 | 0 | 1 | 0 | 0 | 1 |

Fig. 45

REDUNDANT EXTERNAL STORAGE VIRTUALIZATION COMPUTER SYSTEM

BACKGROUND OF INVENTION

1. Field of the Invention

The invention relates to a redundant external storage virtualization computer system. More particularly, a redundant external storage virtualization computer system that uses point-to-point serial-signal interconnects as the primary device-side IO device interconnects is disclosed.

2. Description of the Prior Art

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, otherwise, operates independently of the host.

One example of an external Storage Virtualization Controller is an external, or stand-alone, direct-access RAID controller. A RAID controller combines sections on one or multiple physical storage devices (PSDs), the combination of which is determined by the nature of a particular RAID level, to form logical media units that are contiguously addressable by a host system to which the logical media unit is made available. A single RAID controller will typically support multiple RAID levels so that different logical media units may consist of sections of PSDs combined in different ways by virtue of the different RAID levels that characterize the different units.

Another example of an external Storage Virtualization Controller is a JBOD emulation controller. A JBOD, short for "Just a Bunch of Drives", is a set of physical DASDs that connect directly to a host system via one or more a multiple-device IO device interconnect channels. PSDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel.

Another example of an external Storage Virtualization Controller is a controller for an external tape backup subsystem.

The primary motivation in configuring a pair of external storage virtualization controllers (SVCs) into a redundant pair is to allow continued, uninterrupted access to data by a host (or more than one host) even in the event of a malfunction or failure of a single SVC. This is accomplished by incorporating functionality into the SVCs that allow one controller to take over for the other in the event that the other becomes handicapped or completely incapacitated.

On the device side, this requires that both controllers are able to access all of the physical storage devices (PSDs) that are being managed by the SVCs, no matter which SVC any given PSD may initially be assigned to be managed by. On the host side, this requires that each SVC have the ability to present and make available to the host all accessible resources, including those that were originally assigned to be managed by the alternate SVC, in the event that its mate does not initially come on line or goes off line at some point (e.g., due to a malfunction/failure, maintenance operation, etc.).

A typical device-side implementation of this would be one in which device-side IO device interconnects are of the multiple-initiator, multiple-device kind (such as Fibre, Parallel SCSI), and all device-side IO device interconnects are connected to both SVCs such that either SVC can access any PSD connected on a device-side IO device interconnect. When both SVCs are on-line and operational, each PSD would be managed by one or the other SVC, typically determined by user setting or configuration. As an example, all member PSDs of a logical media unit (LMU) that consists of a RAID combination of PSDs would be managed by the particular SVC to which the logical media unit itself is assigned.

A typical host-side implementation would consist of multiple-device IO device interconnects to which the host(s) and both SVCs are connected and, for each interconnect, each SVC would present its own unique set of device IDs, to which LMUs are mapped. If a particular SVC does not come on line or goes off line, the on-line SVC presents both sets of device IDs on the host-side interconnect, its own set together with the set normally assigned to its mate, and maps LMUs to these IDs in the identical way they are mapped when both SVCs are on-line and fully operational. In this kind of implementation, no special functionality on the part of the host that switches over from one device/path to another is required to maintain access to all logical media units in the event that an SVC is not on-line. This kind of implementation is commonly referred to as "transparent" redundancy.

Redundant SVC configurations are typically divided into two categories. The first is "active-standby" in which one SVC is presenting, managing, and processing all IO requests for all logical media units in the storage virtualization subsystem (abbreviated SVS) while the other SVC simply stands by ready to take over in the event that the active SVC becomes handicapped or incapacitated. The second is "active-active" in which both SVCs are presenting, managing, and processing IO requests for the various LMUs that are present in the SVS concurrently. In active-active configurations, both SVCs are always ready to take over for the other in the event that one malfunctions, causing it to become handicapped or incapacitated. Active-active configurations typically provide better levels of performance because the resources of both SVCs (e.g., CPU time, internal bus bandwidth, etc) can be brought to bear in servicing IO requests rather than the resources of only one SVC.

Another essential element of a redundant storage virtualization system is the ability for each SVC to monitor the status of the other. Typically, this would be accomplished by implementing an inter-controller communications channel (abbreviated ICC) between the two SVCs over which they can exchange the operating status. This communications channel may be dedicated, the sole function of which is to exchange parameters and data relating to the operation of the redundant storage virtualization subsystem, or it can be one or more of the IO device interconnects, host-side or device-side, over which operational parameters and data exchange are multiplexed together with host-SVC or device-SVC IO-request-associated data on these interconnects.

Yet another important element of a redundant storage virtualization system is the ability of one SVC to completely incapacitate the other so that it can completely take over for the other SVC without interference. For example, for the surviving SVC to take on the identity of its mate, it may need to take on the device IDs that the SVC going off line originally presented on the host-side IO device interconnect, which, in turn, requires that the SVC going off line relinquish its control over those IDs.

This "incapacitation" is typically accomplished by the assertion of reset signal lines on the controller being taken off line bringing all externally connected signal lines to a pre-defined state that eliminates the possibility of interference with the surviving SVC. Interconnecting reset lines between the SVCs so that one can reset the other in this event is one common way of achieving this. Another way to accomplish this is to build in the ability of an SVC to detect when itself may be malfunctioning and "kill" itself by asserting its own reset signals (e.g., inclusion of a "watchdog" timer that will assert a reset signal should the program running on the SVC fail to poll it within a predefined interval), bringing all externally connected signal lines to a pre-defined state that eliminates the possibility of interference with the surviving SVC.

Traditionally storage virtualization has been done with Parallel SCSI or Fibre IO device interconnects as the primary device-side IO device interconnects connecting physical storage devices to the storage virtualization controller pair. Both Parallel SCSI and Fibre are multiple-device IO device interconnects. A multiple-device IO device interconnect is a form of IO device interconnect that allows multiple IO devices to be connected directly, meaning without the need for any extra off-device intervening active circuitry, to a single host system or multiple host systems (note that typical FC-ALJBODs do have off-device active circuitry, but the purpose of this circuitry is not to enable the interconnection but rather to accommodate the possibility of a failure in the DASD or a swapping out of the DASD that might cause a fatal break in the IO interconnect). Common examples of multiple-device IO device interconnects are Fibre channel FC-AL and Parallel SCSI. Multiple-device IO device interconnects share bandwidth among all hosts and all devices interconnected by the interconnects.

Please refer to FIG. 1, where a block diagram of a conventional redundant external storage virtualization computer system is illustrated. Note the interconnection of the host-side IO device interconnects that allows an SVC to take over for its mate by taking over the IO device interconnect IDs that would normally be presented onto the interconnect by its mate and mapping logical media units to these IDs in the same way its mate would. Also, note the interconnection of the device-side IO device interconnects that allow both SVCs access to all PSDs connected to the device-side IO device interconnects. In this example, a typical IO device interconnect that might be used on either host side or device side might be parallel SCSI or Fibre FC-AL, both multiple-initiator, multiple-device IO device interconnects. Therefore, both SVCs operating in target mode (i.e., device mode) are connected to a single interconnect on the host side and allow both SVCs operating in initiator mode, together with multiple devices, to be interconnected on the device side. The configuration shown in FIG. 1 suffers from the drawback that a malfunction of a single PSD, depending on the nature of the malfunction, can potentially bring down an entire device-side IO device interconnect making all other PSDs connected on the same interconnect inaccessible.

FIG. 2 diagrams an improvement on this that effectively avoids the possibility that access to other PSDs connected on the same device-side IO device interconnect might be disrupted due to a malfunction that causes a single device-side interconnect to fail by making use of dual-ported PSDs and adding an additional interconnect to each PSD. In this way, the blockage of a single device-side IO device interconnect, possibly caused by a malfunction of an interconnect controller IC on the PSD, would not result in the inaccessibility of other PSDs connected on the same interconnect because the second interconnect connected to each of the same PSDs can be used to access those PSDs without interference.

The configuration shown in FIG. 2 has the further advantage that IO request load can be distributed between the redundant device-side interconnects thereby effectively doubling the overall bandwidth of the device-side IO device interconnect subsystem as compared to the single-interconnect-per-PSD-set configuration shown in FIG. 1. In this case, the typical device-side IO device interconnect of choice would typically be Fibre FC-AL because of the dual-ported nature of Fibre FC-AL PSDs currently on the market and the elements of the Fibre protocol that allow an initiator, such as an SVC, to determine which interconnect IDs on different interconnects correspond to the same PSD.

While the configuration depicted in FIG. 2 is, indeed, far more robust than that depicted in FIG. 1 in the face of device-side IO device interconnect failure, there is still the possibility that a PSD might malfunction in such a way that it could bring down both IO device interconnects that are connected to its dual-ported port pair. Were this to happen, once again, access to other PSDs connected on the same interconnect pair would be disrupted. In a logical media unit that consists of a standard singly-redundant RAID combination of PSDs (e.g., RAID 5), this could prove disastrous for it can cause multiple PSDs in the combination to go off line causing the entire LMU to go off line.

SUMMARY OF INVENTION

It is therefore a primary objective of the claimed invention to provide a redundant external storage virtualization computer system using point-to-point serial-signal transmissions as the primary device-side IO device interconnects to solve the above-mentioned problem.

According to the claimed invention, a redundant external storage virtualization computer system is introduced. The redundant external storage virtualization computer system includes a host entity for issuing an IO request, a redundant storage virtualization controller pair coupled to the host entity for performing an IO operation in response to the IO request issued by the host entity, and a plurality of physical storage devices for providing storage to the computer system. Each of the physical storage devices is coupled to the redundant storage virtualization controller pair through a point-to-point serial-signal interconnect. The redundant storage virtualization controller pair includes a first and a second storage virtualization controller coupled to the host entity. In the redundant storage virtualization controller pair, when the first storage virtualization controller is not on line or not in operation, the second storage virtualization controller will take over the functionality originally performed by the first storage virtualization controller. In one embodiment, of the present invention, the point-to-point serial-signal interconnect is a Serial ATA IO device interconnect.

It is an advantage of the claimed invention that in the redundant external storage virtualization computer system using Serial ATA as the primary device-side IO device, each physical storage device has a dedicated interconnect to the storage virtualization controller pair.

It is another advantage of the claimed invention that not only the payload data portion of information but also the control information are protected by the SATA IO device interconnect.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 13 illustrates a first FIS data structure complying with serial ATA protocol.

FIG. 14 illustrates a second FIS data structure complying with serial ATA protocol.

FIG. 40 is a truth table for the control switch of FIG. 4.

FIG. 41 is a truth table for the control switch of FIG. 5.

FIG. 42 is a table for rerouting loop connections in the event of malfunction.

FIG. 43 is a truth table for the circuit shown in FIG. 29.

FIG. 44 is a truth table for the circuit shown in FIG. 30.

FIG. 45 is a truth table for the circuit shown in FIG. 31.

DETAILED DESCRIPTION

Figure 1:
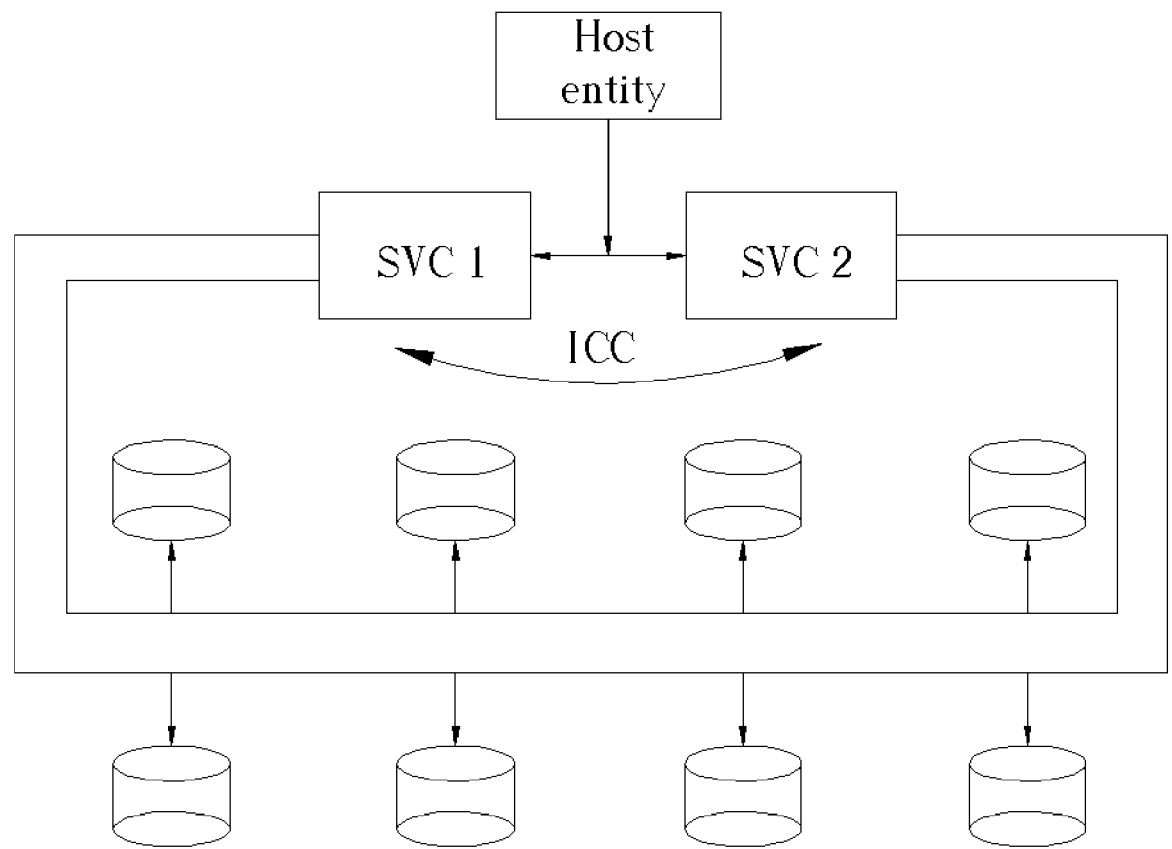
FIG. 1 is a block diagram of a conventional redundant external storage virtualization computer system.
Figure 2:
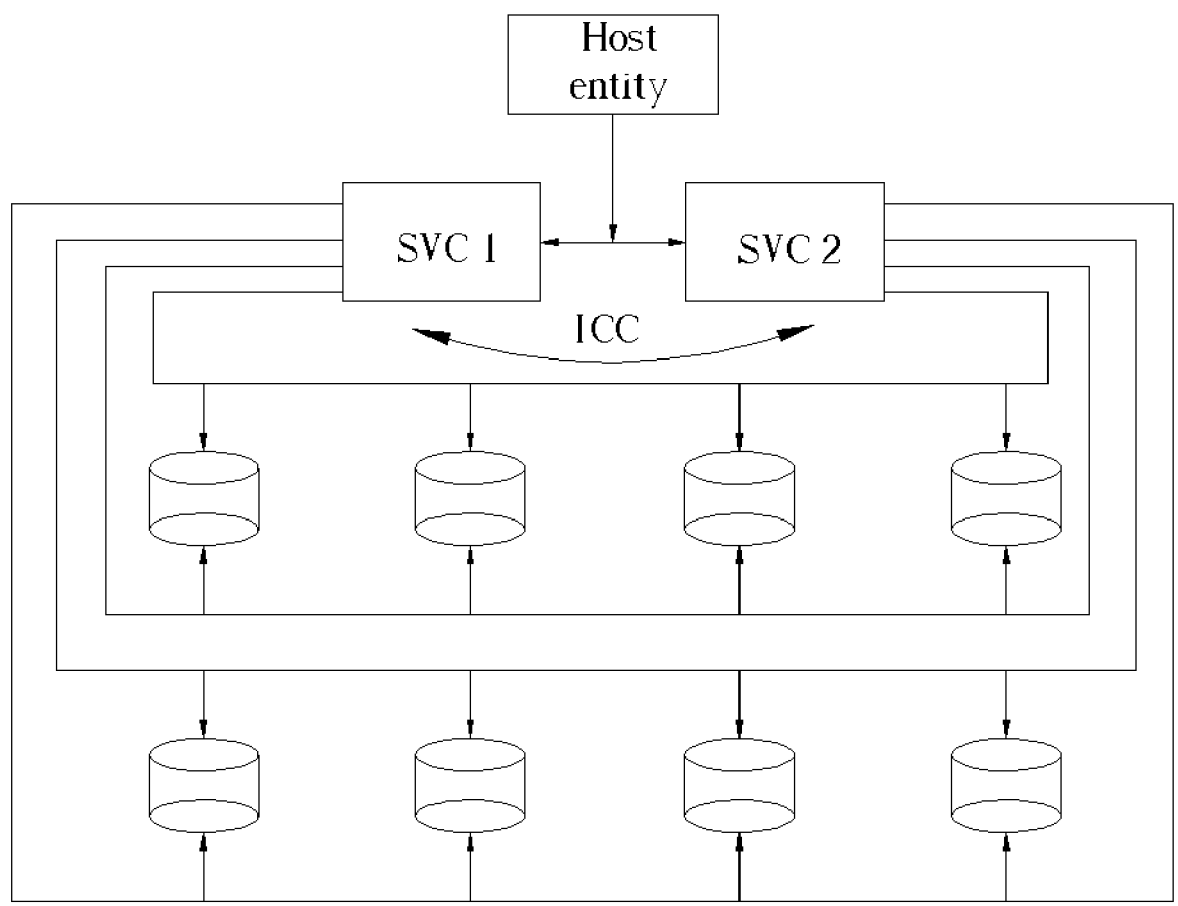
FIG. 2 is a block diagram of another conventional redundant external storage virtualization computer system.
Figure 3:
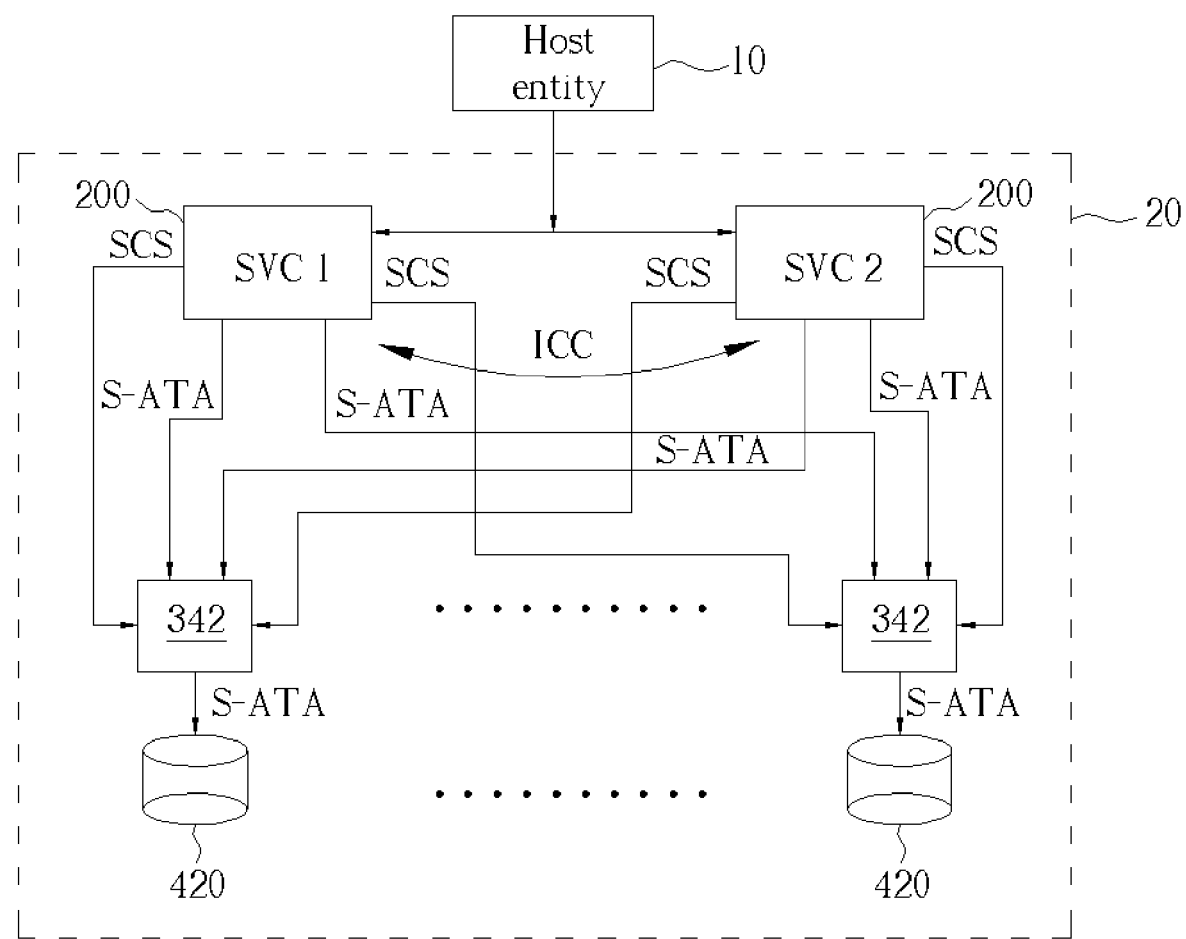
FIG. 3 is a block diagram of a redundant external storage virtualization computer system according to the present invention.

Please refer to FIG. 3, where an embodiment block diagram of the current invention is illustrated. The system contains a host entity 10 and a redundant storage virtualization subsystem (SVS) 20. The SVS 20 contains a redundant storage virtualization controller pair (including SVC1 200 and SVC2 200) and a plurality of PSDs 420. The redundant storage virtualization subsystem configuration incorporates dedicated, point-to-point IO device interconnects to connect all PSDs 420 to both SVCs 200. The storage virtualization controller 200 can be a RAID controller or a JBOD emulator.

Although there is illustrated in FIG. 3 only one host entity 10 connected with one SVS 20, there can be more than one host entity 10 attached to the SVS 20. The host entity 10 can be a host computer, such as a server system, a workstation, a PC system, or the like. Alternatively, the host entity 10 can be another SVC.

In order to allow both controllers to access the same PSD 420, an access control switch 342 is inserted in the device-side IO device interconnect path between the SVCs 200 and a PSD 420. Because of the point-to-point nature of the interconnect, only one SVC 200, i.e. the SVC 200 to which the particular PSD 420 is assigned at the time, can be actively accessing the PSD 420 at a time. The other SVC 200 remains in a stand-by mode with respect to this PSD 420 with its IO device interconnect to the particular PSD 420 disabled. One signal line from each SVC 200 is provided for controlling the access control switch 342. The switch 342 determines which SVC interconnect is patched through to the PSD 420.

Figure 4:
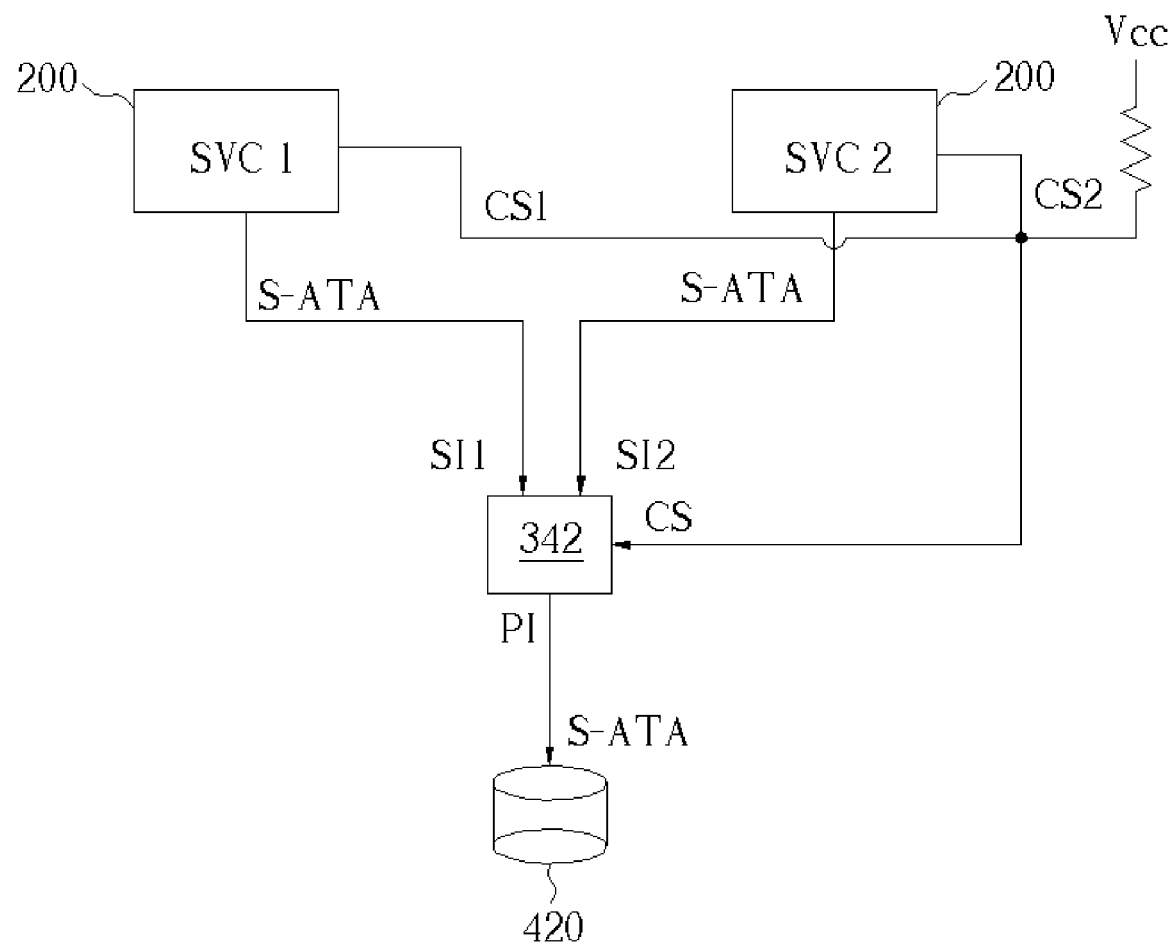
FIG. 4 is a block diagram of an access control switch using only one signal line to control states and a related truth table.
Figure 5:
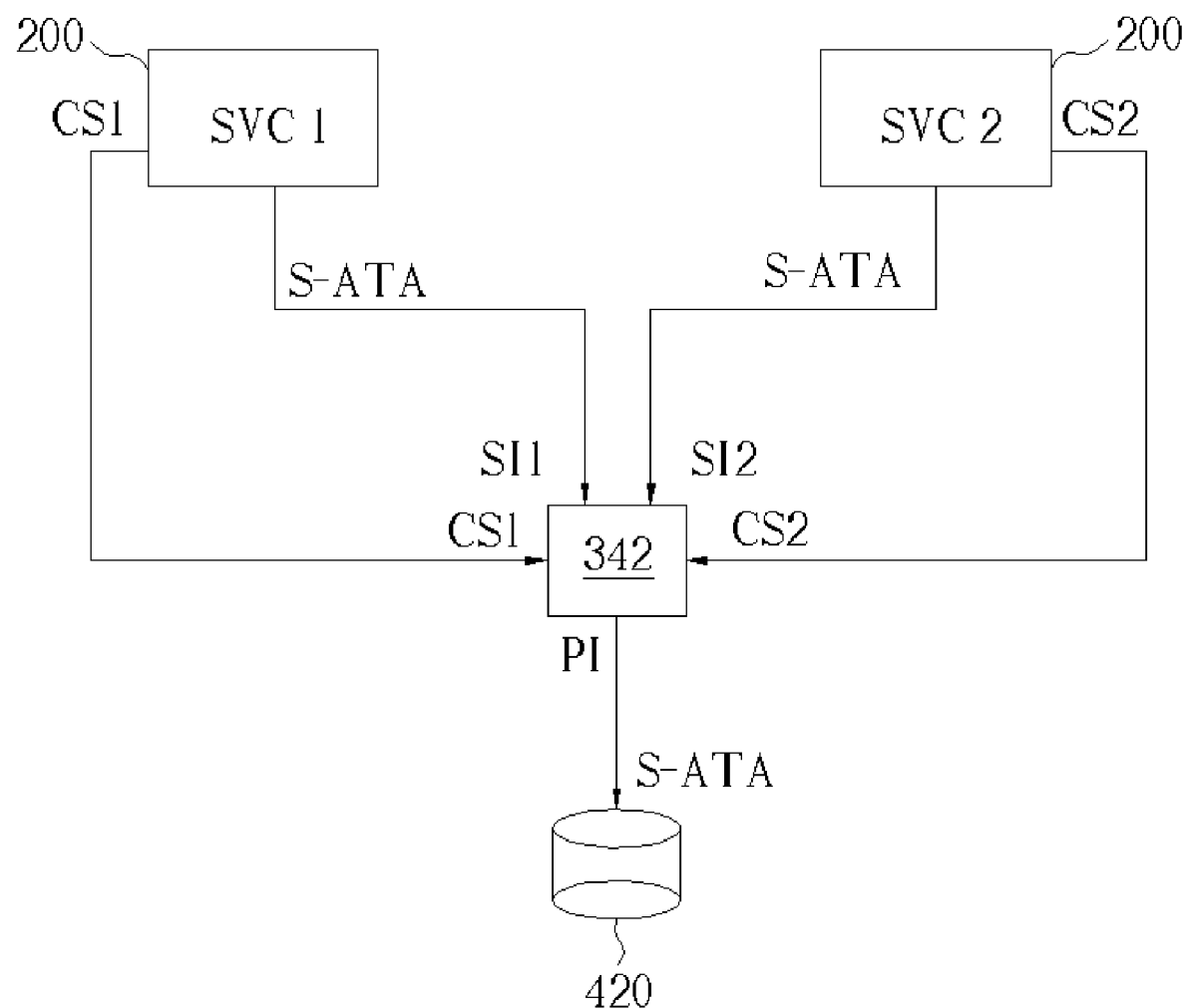
FIG. 5 is a block diagram of an access control switch using two signal lines to control states and a related truth table.

As depicted in FIG. 4, these signal lines may be wired together outside the switch to form a single control line that controls the state of the switch 342 according to a truth table shown in FIG. 40. Alternately, as shown in FIG. 5, the switch 342 can be designed to accept two control inputs, one from each SVC 200 with a truth table (FIG. 41) determining the state of the switch 342 for the four possible combinations of signals from the two SVCs.

Figure 36:
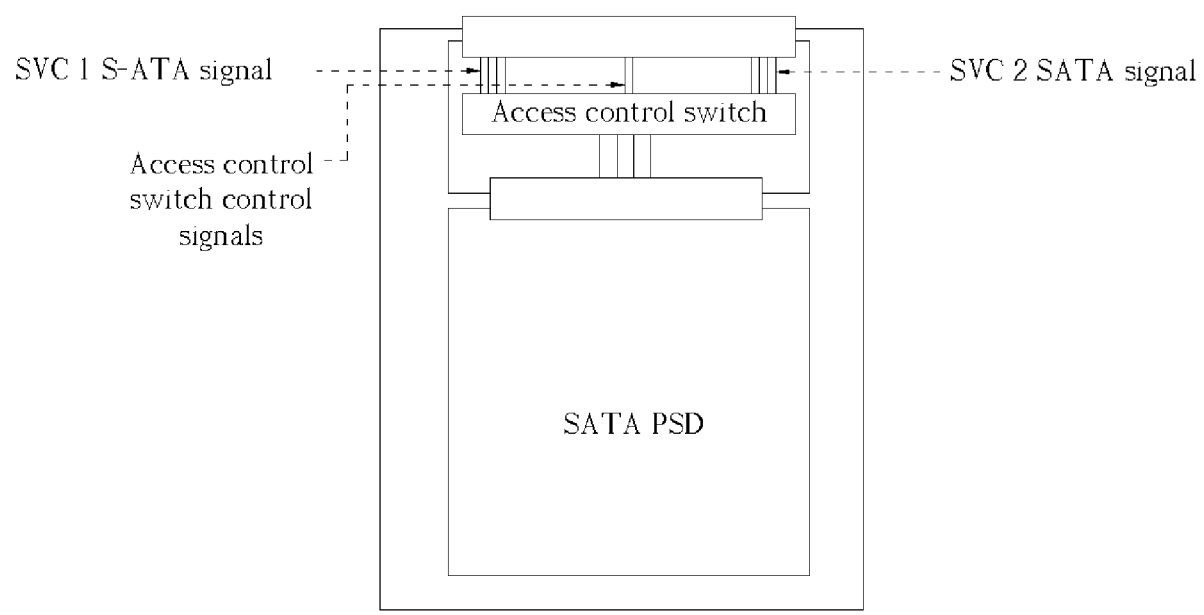
FIG. 36 is a block diagram of a removable redundant SATA-PSD canister.
Figure 38:
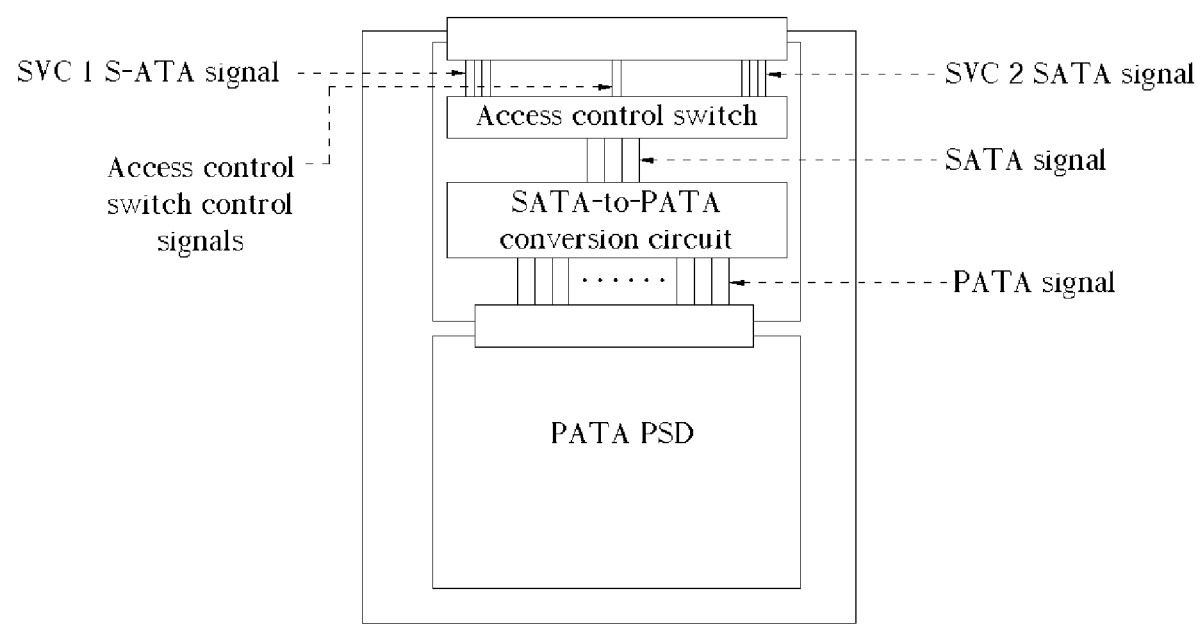
FIG. 38 is a block diagram of a removable redundant PATA-PSD canister.

In a redundant SVS in which it is important that any active components or groups thereof be positioned in hot-swappable units so that the subsystem does not have to be brought down in order to replace such components should a component failure occur. Such hot-swappable units are typically referred to as "Field Replaceable Units" (abbreviated FRU). Being active components, both the PSD itself and the access control switch would quite naturally also be located on FRUs. It makes sense to put them together on the same FRU, for one cannot achieve its intended functionality without the other. Therefore, the access control switch would typically be situated with the PSD in the removable PSD canister. FIG. 36 and FIG. 38 show block diagrams of one possible such arrangement.

Figure 6:
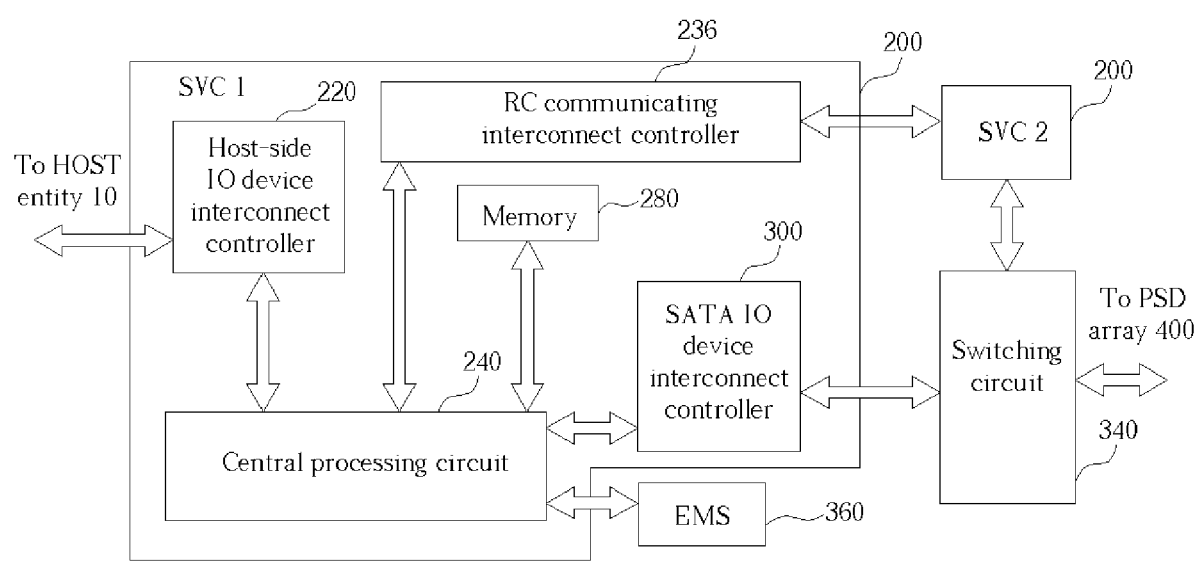
FIG. 6 is a block diagram of an SVC according to the present invention.

In one implementation, all of the PSDs 420 in the SVS 20 can be combined to form a PSD array 400, and all the access control switches 342 can be combined to form a switching circuit 340. An example of such implementation is shown in FIG. 6. FIG. 6 depicts a block diagram showing an embodiment of an SVC 200 according to the present invention and the connection thereof to the host entity 10 and the PSD array 400. In this embodiment, the SVC1 200 comprises a host-side IO device interconnect controller 220, a central processing circuit (CPC) 240, a memory 280, a SATA IO device interconnect controller 300, and a redundant controller communicating (RCC) interconnect controller 236. Although illustrated in separate functional blocks, some or all of these functional blocks can be incorporated into to one chip. For example, the RCC interconnect controller 236 can be integrated with the host-side IO device interconnect controller 220 as a single-chip IC.

The host-side IO device interconnect controller 220 is connected to the host entity 10 and the CPC 240 to serve as an interface and buffer between the SVC1 200 and the host entity 10, and receives IO requests and related data from the host entity 10 and maps and/or transfers them to the CPC 240. The host-side IO device interconnect controller 220 comprises one or more host-side ports for coupling to the host entity 10. Some common port types that might be incorporated here are: Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode.

When the CPC 240 receives the IO requests of the host entity 10 from the host-side IO device interconnect controller 220, CPC 240 parses it and performs some operations in response to the IO requests and sends the data requested and/or reports and/or information of the SVC1 200 back to the host entity 10 through the host-side IO device interconnect controller 220.

After parsing a request received from the host entity 10, while a read request being received and performing one or more operations in response, the CPC 240 get the requested data either internally or from the memory 280, or in both ways, and transfers them to the host entity 10. If the data is not available either internally or does not exists in the memory 280, the IO request will be issued to the PSD array 400 through the SATA IO device interconnect controller 300 and the switching circuit. The requested data will then be transferred from the PSD array 400 to the memory 280 and passed to the host entity 10 through host-side IO device interconnect controller 220.

When a write request is received from the host entity 10, after parsing the request and performing one or more operations, the CPC 240 gets the data from the host entity 10 through the host-side IO device interconnect controller 220, stores them in the memory 280, and then transmits the data to the PSD array 400 through the CPC 240. When the write request is a write back request, the IO complete report can be issued to the host entity 10 first and then the CPC 240 performs the actual write operation later; otherwise, an IO complete report can be issued to the host entity 10 after the requested data is actually written into the PSD array 400.

The memory 280 is connected to the CPC 240 and acts as a buffer to buffer the data transferred between the host entity 10 and the PSD array 400 through the CPC 240. In one embodiment, the memory 280 can be a DRAM; or more particularly, the DRAM can be a SDRAM.

The SATA IO device interconnect controller 300 is the device-side IO device interconnect controller connected between the CPC 240 and the PSD array 400. It serves as an interface and buffer between the SVC 200 and the PSD array 400 and receives IO requests and related data issued from CPC 240 and maps and/or transfers them to the PSD array 400. The SATA IO device interconnect controller 300 reformats the data and control signals received from CPC 240 to comply with SATA protocol and transmits them to the PSD array 400.

An enclosure management service (EMS) circuitry 360 can be attached to the CPC 240 for management circuitry on an enclosure for containing the PSD array 400. In another arrangement of the SVS 20, the EMS circuitry 360 can be omitted, depending on the actual requirements of the various product functionality. Alternatively, the function of the EMS circuitry 360 can be incorporated into the CPC 240.

In this embodiment, the RCC interconnect controller 236 is implemented in SVC1 200 to connect the CPC 240 to SVC2 200. In addition, the SATA IO device interconnect controller 300 is connected to the PSD array 400 through the switching circuit 340. The switching circuit 340 is also connected to the SVC2 200. In this arrangement, the SVC2 200 can be attached to the SVC1 200. The PSD array 400 can be accessed by the two SVCs 200 through the switching circuit 340. Moreover, the control/data information from the host 10 can be transferred from the CPC 240 through the RCC interconnect controller 236 to the SVC2 200 and further to a second PSD array (not shown).

Figure 7:
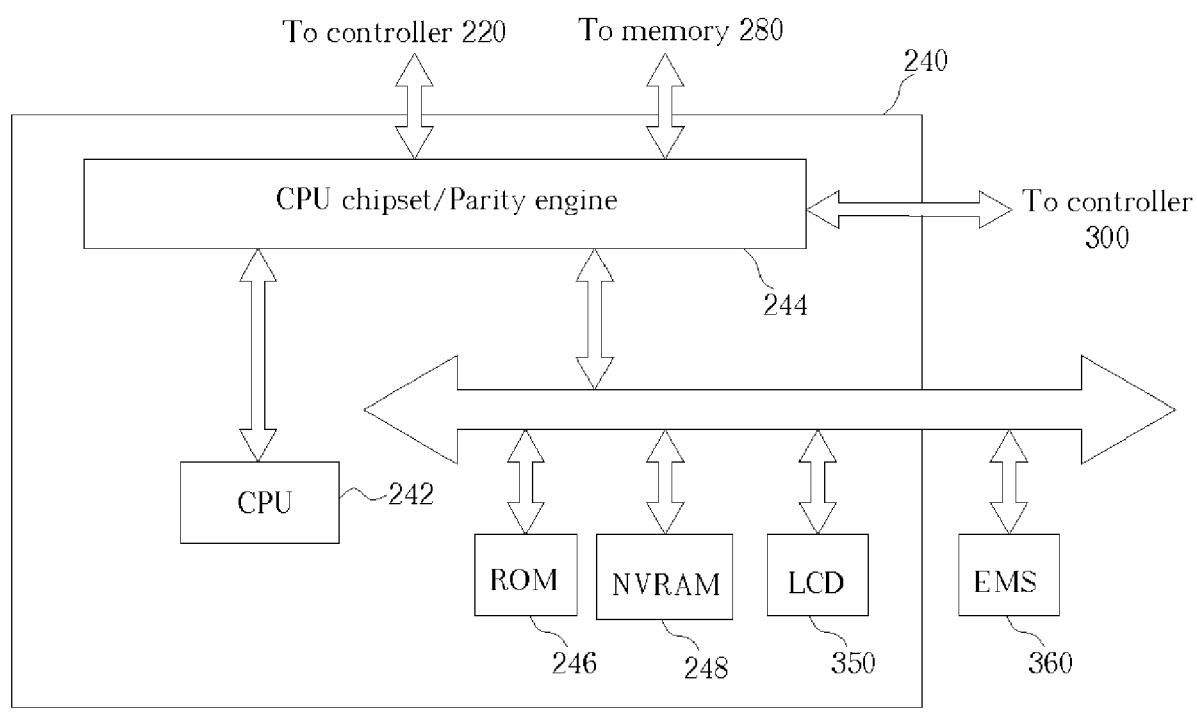
FIG. 7 is an embodiment block diagram of the CPC in FIG. 6.

In FIG. 7, an embodiment of the CPC 240 is shown, comprising the CPU chipset/parity engine 244, the CPU 242, a ROM (Read Only Memory) 246, a NVRAM (Non-volatile RAM) 248, an LCD module 350 and an enclosure management service circuitry EMS 360. The CPU can be, e.g., a Power PC CPU. The ROM 246 can be a FLASH memory for storing BIOS and/or other programs. The NVRAM is provided for saving some information regarding the IO operation execution status of the disk which can be examined after an abnormal power shut-off occurs and meanwhile the IO operation execution does not complete. LCD module 350 shows the operation of the subsystem LCDs. EMS 360 can control the power of the DASA array and do some other management. The ROM 246, the NVRAM 248, the LCD module 350 and the enclosure management service circuitry EMS 360 are connected to the CPU chipset/parity engine 244 through an X-bus.

Figure 8:
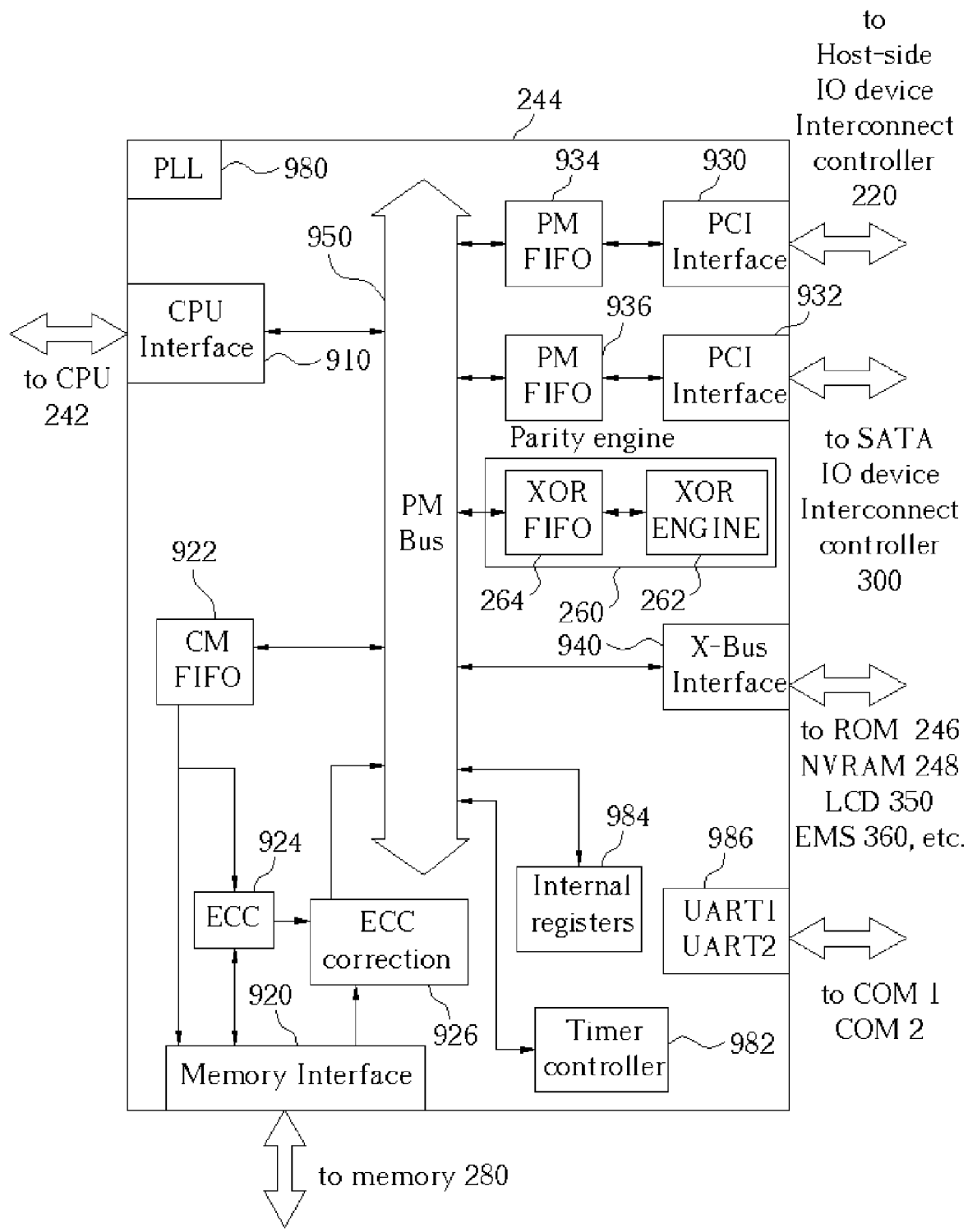
FIG. 8 is an embodiment block diagram of the CPU chipset/parity engine in FIG. 7.

FIG. 8 is a block diagram illustrating an embodiment of the CPU chipset/parity engine 244 according to the present invention. In the present embodiment, the CPU chipset/parity engine 244 mainly comprises parity engine 260, CPU interface 910, memory interface 920, PCI interfaces 930, 932, X-BUS interface 940, and PM BUS 950. The PM BUS 950 is, for example, a 64-bit, 133 Mhz bus and connects the parity engine 260, CPU interface 910, memory interface 920, PCI interfaces 930, 932, X-BUS interface 940 altogether for communicating data signal and control signal among them.

Data and control signals from host-side IO device interconnect controller 220 enter CPU chip/parity engine 244 through PCI interface 930 and are buffered in PM FIFO 934. The PCI interface 930 to the host-side IO device interconnect controller 220 can be, for example, of a bandwidth of 64-bit, 66 Mhz. When in the PCI slave cycle, the PCI interface 930 owns the PM bus 950 and the data and control signals in the PM FIFO 934 are then transmitted to either the memory interface 920 or to the CPU interface 910.

The data and control signals received by the CPU interface 910 from PM bus 950 are transmitted to CPU 242 for further treatment. The communication between the CPU interface 910 and the CPU 242 can be performed, for example, through a 64 bit data line and a 32 bit address line. The data and control signals can be transmitted to the memory interface 920 through a CM FIFO 922 of a bandwidth of 64 bit, 133 MHz.

An ECC (Error Correction Code) circuit 924 is also provided and connected between the CM FIFO 922 and the memory interface 920 to generate ECC code. The ECC code can be generated, for example, by XORing 8 bits of data for a bit of ECC code. The memory interface 920 then stores the data and ECC code to the memory 280, for example, an SDRAM. The data in the memory 280 is transmitted to PM bus 950 through the ECC correction circuit 926 and compared with the ECC code from the ECC circuit 924. The ECC correction circuit 926 has the functionality of one-bit auto-correcting and multi-bit error detecting.

The parity engine 260 can perform parity functionality of a certain RAID level in response to the instruction of the CPU 242. Of course, the parity engine 260 can be shut off and perform no parity functionality at all in some situation, for example, in a RAID level 0 case. In one embodiment as shown in the FIG. 8, the parity engine 260 can include an XOR engine 262 to connect with the PM bus 950 through XOR FIFO 264. The XOR engine 262 can perform, for example, the XOR function for a memory location with given address and length of the location.

The PLL (Phase Locked Loop) 980 is provided for maintaining desirable phase shifts between related signals. The timer controller 982 is provided as a timing base for various clocks and signals. The internal registers 984 are provided to register status of CPU chip/parity engine 244 and for controlling the traffic on the PM bus 950. In addition, a pair of UART functionality blocks 986 are provided so that CPU chip/parity engine 244 can communicate with outside through RS232 interface.

In an alternative embodiment, PCI-X interfaces can be used in place of the PCI interfaces 930, 932. Those skilled in the art will know such replacement can be easily accomplished without any difficulty.

Figure 9:
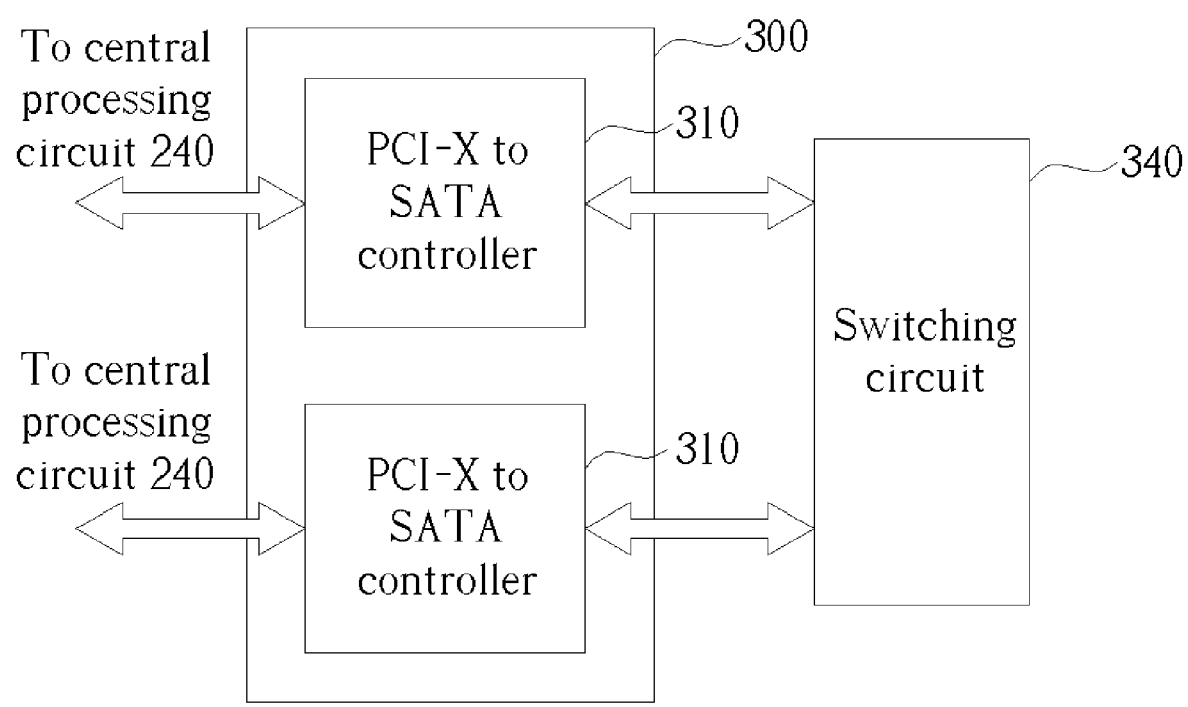
FIG. 9 is a block diagram of the SATA IO device interconnect controller of FIG. 6.
Figure 10:
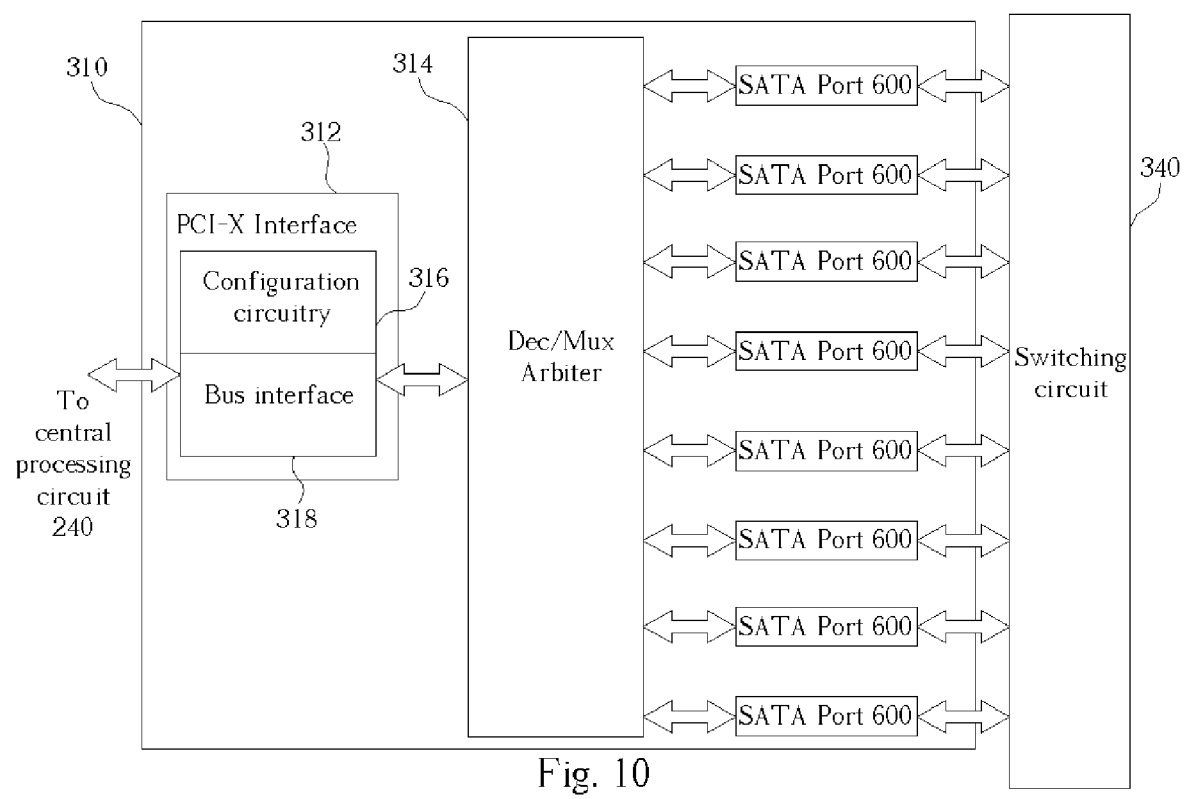
FIG. 10 is a block diagram of the PCI-X to SATA controller of FIG. 9.

Please refer to FIG. 9, where an embodiment block diagram of the SATA IO device interconnect controller 300 of FIG. 6 is illustrated. According to the present embodiment, the SATA IO device interconnect controller 300 comprises two PCI-X to SATA controllers 310. FIG. 10 shows an embodiment block diagram of the PCI-X to SATA controller 310 of FIG. 9. As shown in FIG. 10, each PCI-X to SATA controller 310 comprises a PCI-X Interface 312 connected to the CPC 240, a Dec/Mux Arbiter 314 connected to the PCI-X interface 312, and 8 SATA Ports 600 connected to the Dec/Mux Arbiter 314. The PCI-X interface 312 comprises a bus interface 318 connecting to the Dec/Mux arbiter 314 and a configuration circuitry 316 storing the configuration of the PCI-X to SATA controller 310. The Dec/Mux arbiter 314 performs arbitration between the PCI-X interface 312 and the plurality of SATA ports 600 and address decoding of the transactions from the PCI-X interface 312 to the SATA ports 600. Through an SATA port 600 and the switching circuit 340, the data are transmitted to a PSD 420.

Figure 11:
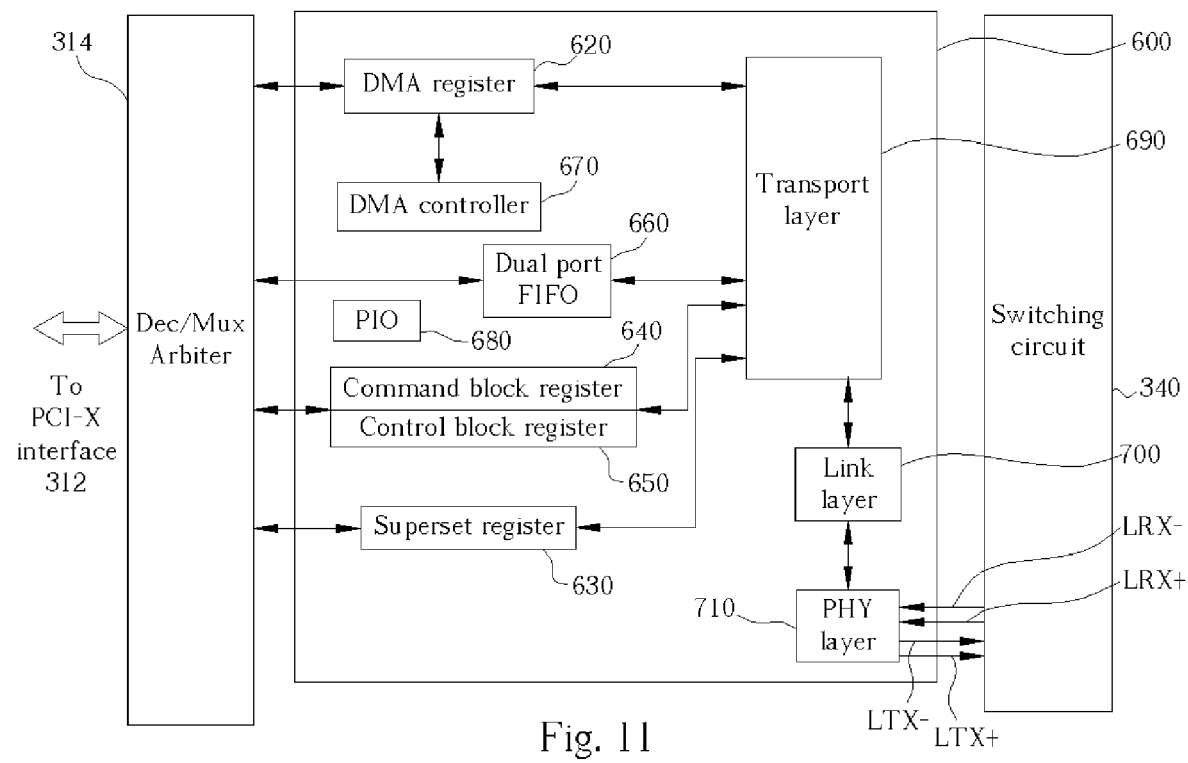
FIG. 11 is a block diagram of the SATA port of FIG. 10

Next please refer to FIG. 11. FIG. 11 shows a block diagram illustrating an embodiment of the SATA port 600 of FIG. 10. As shown in FIG. 11, the SATA ports 600 comprises a superset register 630, a command block register 640, a control block register 650, and a DMA register 620, all connected to the bus interface 318 of the PCI-X interface 312 through the Dec/Mux Arbiter 314. By filling these registers, data will be transferred between the Dec/Mux arbiter 314 and a transport layer 690 through a dual port FIFO 660 under the control of a DMA controller 670. The information received by a transport layer 690 will be reformatted into a frame information structure (FIS) primitive and transmitted to a Link layer 700.

The Link layer 700 is then to re-format the FIS into a frame by adding SOF, CRC, EOF, etc., thereto and performing the 8b/10b encoding into encoded 8b/10b characters and transmits it to a PHY layer 710.

The PHY layer 710 will transmit signals through a pair of differential signal lines, transmission lines LTX+, LTX−, to and receive signals through another pair of differential signal lines, reception lines LRX+, LRX−, through the switching circuit 340 to a PSD controller in a PSD 420. The two signal lines of each pair of the signal lines, for example LTX+/LTX−, transmit signals TX+/TX− simultaneously at inverse voltage, for example, +V/−V or V/+V, with respective to a reference voltage Vref so that the voltage difference will be +2v or 2V and thus enhance signal quality. This is also applicable to the transmission of the reception signals RX+/RX− on reception lines LRX+, LRX−.

When receiving a frame from the PHY layer 710, the Link layer 700 will decode the encoded 8b/10b characters and remove the SOF, CRC, EOF. A CRC will be calculated over the FIS to compare with the received CRC to ensure the correctness of the received information. When receiving a FIS from the Link layer 700, the transport layer 690 will determine the FIS type and distribute the FIS content to the locations indicated by the FIS type.

Figure 12:
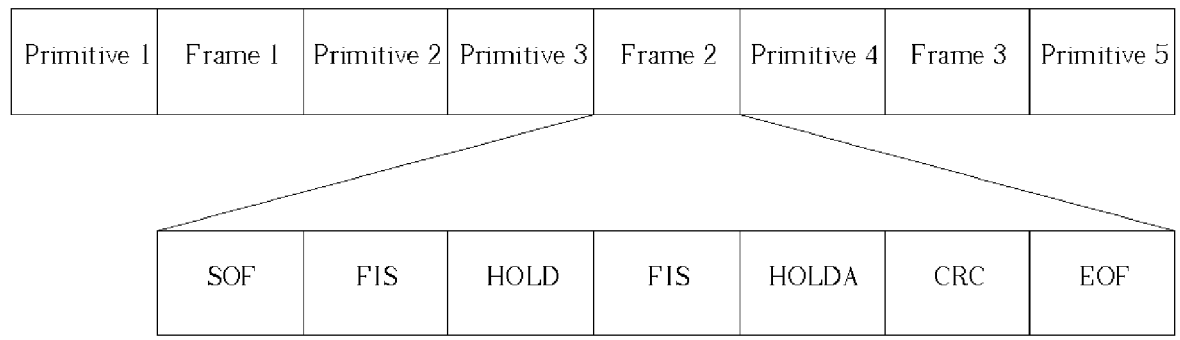
FIG. 12 illustrates the transmission structure complying with serial ATA protocol.

A transmission structure complying with serial ATA protocol is shown in FIG. 12. The information communicated on the serial line is a sequence of 8b/10b encoded characters. The smallest unit thereof is a double-word (32 bits). The contents of each double-word are grouped to provide low-level control information or to transfer information between a host and an device connected thereto. Two types of data structures transmitted on signal lines are primitives and frames.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with an SOF (Start Of Frame) primitive and ends with an EOF (End Of Frame) primitive. The SOF is followed by a user payload called a FIS (Frame Information Structure). A CRC (Cyclic-Redundancy Check Code) is the last non-primitive double-word immediately proceeding the EOF primitive. The CRC is calculated over the contents of the FIS. Some other flow control primitives (HOLD or HOLDA) are allowed between the SOF and EOF to adjust data flow for the purpose of speed matching.

The transport layer constructs FISs for transmission and decomposes FISs received from the link layer. The transport layer does not maintain context of ATA commands or previous FIS content. As requested, the transport layer constructs an FIS by gathering FIS content and placing them in proper order. There are various types of FIS, two of which are shown in FIG. 13 and FIG. 14.

As shown in FIG. 13, a DMA setup FIS contains a HEADER in field 0. The first byte (byte 0) thereof defines the FIS type (41h), and the FIS type defines the rest fields of this FIS and defines the total length of this FIS as seven double-words. Bit D in byte 1 indicates the direction of the subsequent data transfer. D=1 means transmitter to receiver; D=0 means receiver to transmitter. Bit 1 in byte 1 is an interrupt bit. Bit R in byte 1 is a reserved bit and set to 0. DMA buffer identifier low/high field (field 1) indicates the DMA buffer region in the host memory. DMA buffer offset field (field 4) is the byte offset into the buffer. DMA transfer count field (field 5) is the number of bytes that will be read or written by the device.

As shown in FIG. 14, a DATA FIS contains a HEADER in field 0. The first byte (byte 0) thereof defines the FIS type (46h), and the FIS type defines the rest fields of this FIS and defines the total length of this FIS as n+1 double-words. The R bits in byte 1 are reserved bits and set to 0. The fields 1 through n are double-words of data, which contain the data to transfer. The maximum amount of a single DATA FIS is limited.

In the embodiment of FIG. 6, the host-side IO device interconnect controller 220 and the device-side IO device interconnect controller 300 (SATA IO device interconnect controller 300) can be implemented with the same kind of IC chip, with IO device interconnect ports in the host-side IO device interconnect controller 220 configured as host-side IO device interconnect ports and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently.

Please refer back to FIG. 4 and FIG. 5. Typically, the access control switch 342, of which the two depicted in FIG. 4 and FIG. 5 are examples, will be kept in a state that patches through to the PSD 420 the SVC 200 that is assigned to field device-side IO requests that are generated as a result of operations initiated in response to host-side IO requests. However, under certain conditions, it may be necessary to temporarily allow the alternate SVC 200 to access the PSD 420. An example of a configuration in which such a condition can arise is one in which one of the SVCs 200 is designated as the master when it comes to certain PSD-related management functions that are performed by the SVC 200 (e.g., monitoring the health of the PSD 420 or accessing an area of the media on the PSD 420 that is reserved for the SVC pairs internal use), while at the same time, some of the LMUs made accessible to the host entity 10 over the host-side IO device interconnects are assigned to the alternate SVC 200 for the purposes of host-side IO request processing. In this case, the SVCs 200 may communicate between themselves (possibly through the RCC interconnect controller 236 of FIG. 6) to determine an appropriate opportunity in which the state of the switch 342 can be safely altered to allow the alternate SVC 200 access to the PSD 420 without disruption of PSD 420 accesses in process. This process will be referred to hereafter as "PSD access ownership transfer".

Figure 15:
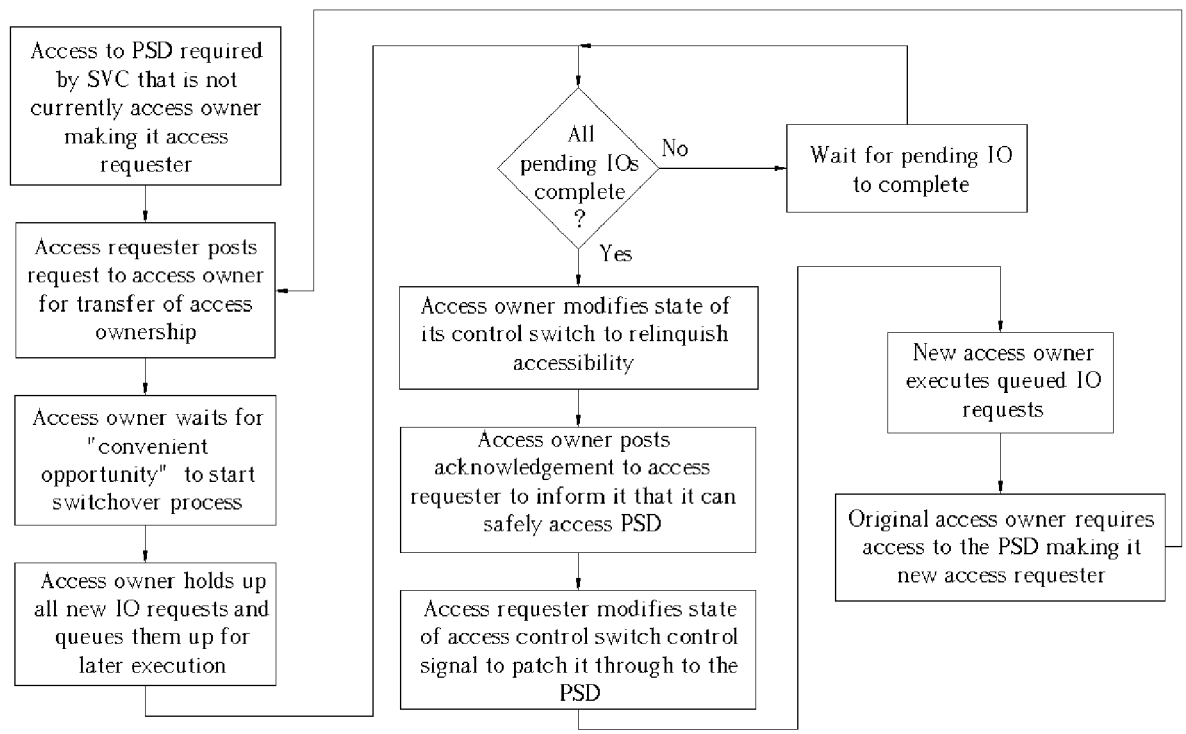
FIG. 15 is a flow chart of a switchover process.

A switchover process is depicted in the flow chart in FIG. 15. Each SVC 200 is able to determine the current state of the switch 342. This can be accomplished by allowing the SVC 200 to read back the state of the control signal(s) or by having each SVC 200 maintain an image in memory of the current state. The SVC 200 that is not currently patched through to the PSD 420 but requires PSD access, termed access requester, posts a request to the SVC 200 that is currently patched through to the PSD 420, termed access owner, to allow the state of the access control switch 342 to be switched to allow the access requester access to the PSD 420. On receipt of this request, the access owner waits for a "convenient" opportunity to start the switchover process. This process entails allowing any pending IO requests to complete while queuing any IO requests that have not yet started. When all pending requests have completed, the access owner modifies the state of its switch control signal to relinquish accessibility to the PSD 420 and then sends an acknowledgement to the access requester informing it that it can now safely access the PSD 420. At this point, the access requester also modifies the state of its switch control signal to gain accessibility to the PSD 420 which completes the process of switchover and the access requester now becomes the new access owner.

At this point, the new access owner is free to issue IO requests to the PSD 420 at will. It may keep ownership until switching back of access ownership is requested by the original access owner, following the same procedure as above. Alternately, at some "convenient" opportunity, as when all the IO requests it has to issue for the time being are executed to completion, the new access owner can automatically start the switch-back process by modifying the state of its access control switch control signal to relinquish accessibility to the PSD 420 and issuing an unsolicited acknowledgement to the original access owner informing it that access ownership has been relinquished and the original access owner can now take back access ownership.

Typically, whether the new access owner keeps ownership until a request for switch-back from the original access owner is posted or it automatically transfers ownership back to the original access owner might be fixed by implementation or might be dynamically decided based on such factors as relative frequency of access by the two SVCs 200 and the relative performance impact of keeping ownership versus automatically restoring ownership to the original access owner.

The mechanism of inter-controller communication to achieve the above switchover process can take any of a number of forms. One possible mechanism of communication, referred to here as the Binary Signal Pair Access Ownership Arbitration mechanism, is a pair of "access request" signal lines per SATA IO device interconnect, with each digital binary signal line having one SVC 200 set/clear (active SVC on this signal line) the signal and the other SVC 200 read the state of the signal (passive SVC). One of the access request signal lines has SVC1 200 active and SVC2 200 passive while the other access request signal line has SVC1 200 passive and SVC2 200 active. On the passive side, the SVC 200 can read both the current state of the alternate SVC's access request signal and whether the signal has changed state since last reading. On reading, the latter will be cleared.

In this mechanism, at the outset, one SVC 200 has ownership of the SATA IO device interconnect and has the signal line associated with the IO device interconnect asserted. When the alternate SVC 200 wishes to assume ownership, it becomes the access requester and asserts the signal line on which it is active. It then monitors the signal line on which it is passive, watching for a change in its state indicating that it was deasserted at some point, which, in turn, indicates that the access owner acknowledged its request. At this point, the requesting SVC 200 can take control of the SATA IO device interconnect by altering the state of the switch 342 so that it is patched through to the PSD 420.

Figure 16:
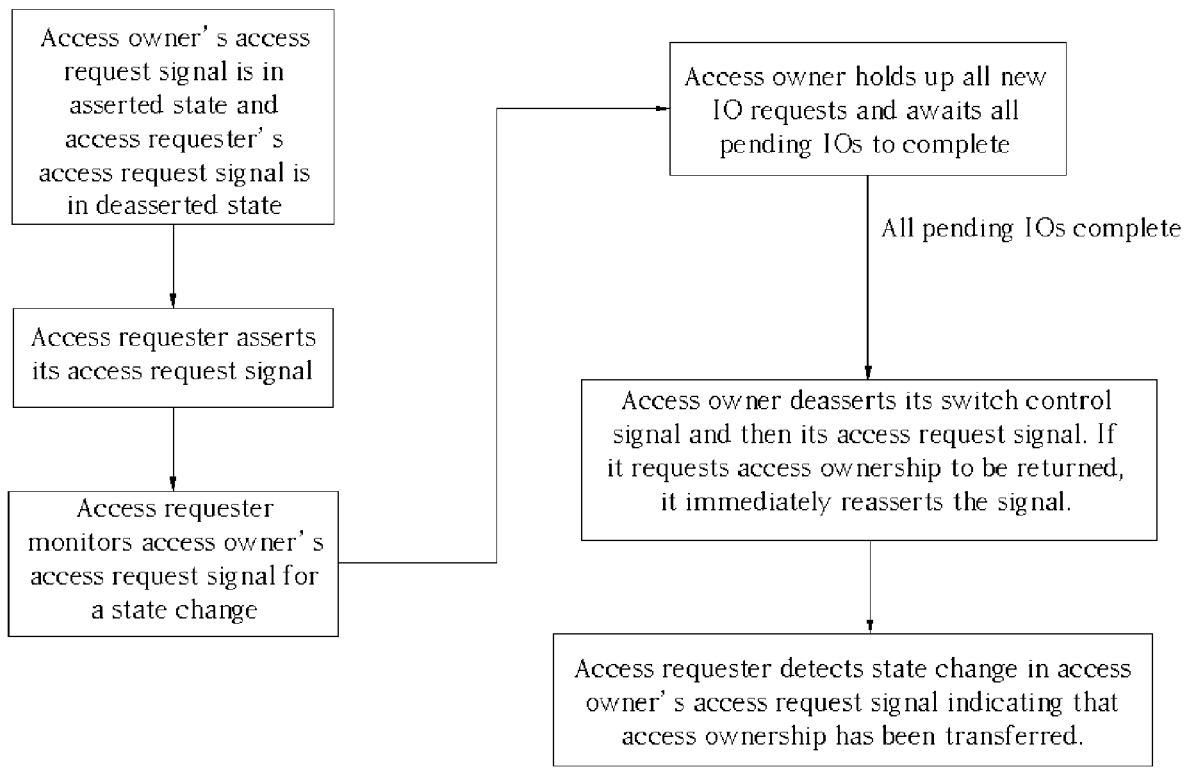
FIG. 16 is a flow chart of a switchover process when a Binary Signal Pair Access Ownership Arbitration mechanism is used.

The access owner, on the other hand, continuously monitors for assertion the signal line on which it is passive. Following detection of assertion, at a "convenient" time, it starts waiting for any pending IO requests to complete while queuing any new IO requests. When all pending IO requests are complete, it acknowledges the access control request by deasserting the signal line on which it is active. If it wishes access control to be returned, as when there are new queued IO requests to be issued, it reasserts the signal line. The access requester monitors the signal line on which it is passive for a change in state rather than for a deasserted state because the access owner may have deasserted, then immediately asserted the signal line such that the access requester may not have the chance to detect the deasserted state. FIG. 16 depicts the flow chart described above.

A variation on the above Binary Signal Pair Access Ownership Arbitration mechanism for achieving coordinated access ownership transfer would be to implement a pair of HW circuits, referred to here as "Access Ownership Arbitration" circuits (abbreviated AOA), one for each SVC, that indirectly control the access control switch control signals rather than those signals being controlled directly by the SVC.

The output from one of the two AOAS would be connected to and control the access control switch control signal associated with one of the SVCs and the output from the other circuit would be connected to and control the access control switch control signal associated with other SVC. In addition, each of these AOAS would have the "Access Ownership Request" signals (abbreviated AOR) from both of the SVCs as inputs. When an SVC does not possess nor is requesting access ownership, its AOR is kept in a deasserted state. While in this state, the output signal of the AOA associated with this SVC is inactive. When the SVC wishes to assume ownership, it asserts its AOR. If the other SVC's AOR is not active, then the AOA associated with the requesting SVC would assert its output signal thereby asserting the access control switch control signal associated with the requesting SVC. If the other SVC's AOR is active, then the requesting SVC's AOA's output remains deasserted until the other SVC's AOR is deasserted, at which time the requesting SVC's AOA output becomes active. The requesting SVC's AOA output then remains active until the requesting SVC's AOR is deasserted, independent of the state of the other SVC's AOR. Typically, the two AOAS would be located in close proximity to the access control switch itself, such as in the PSD canister together with the access control switch.

Figure 17:
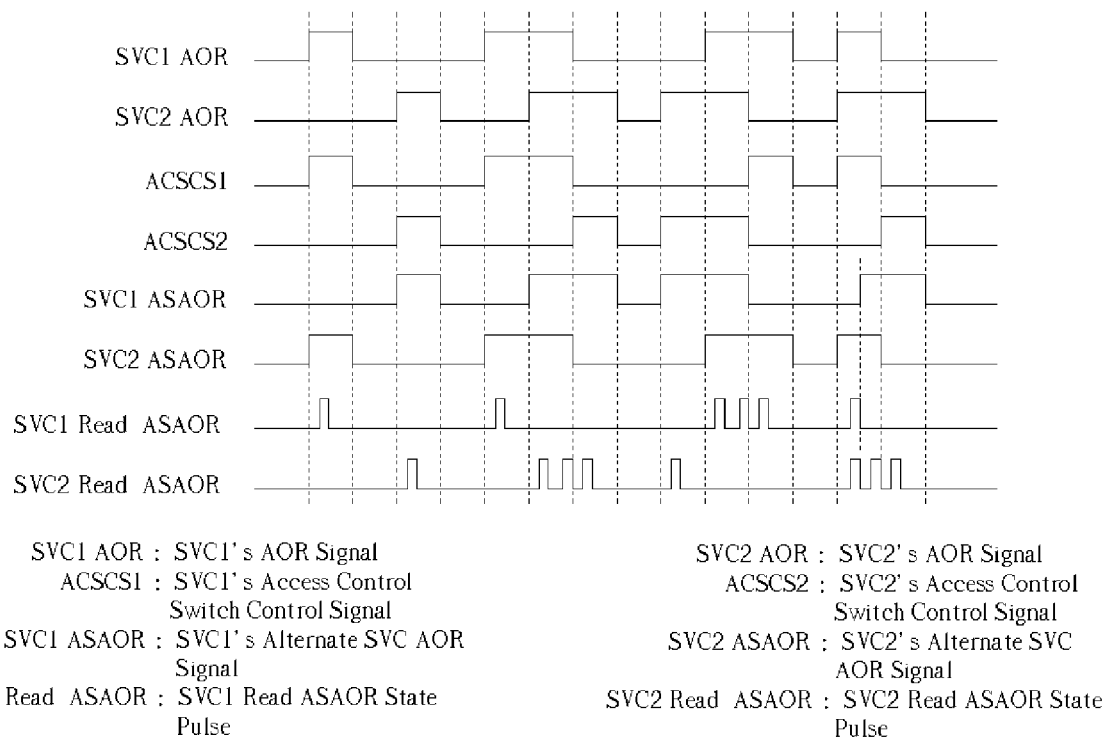
FIG. 17 is a timing diagram for a switchover process of an alternate Binary Signal Pair Access Ownership Arbitration mechanism.

A facility by which a SVC can determine whether or not it was granted access ownership in the event that both SVC's assert their AORs concurrently and by which the SVC currently possessing access ownership can determine when the other SVC is requesting access ownership is also required in this mechanism. Providing a SVC the ability to determine the state of the access control switch would accomplish the former while providing the ability to determine the state of the other SVC's AOR would achieve the latter. However, since these two determinations are made at different times during the access ownership transfer process, they can be combined into a single facility consisting single digital binary signal per SVC, referred to here as the "Alternate SVC Access Ownership Request" signal (abbreviated ASAOR), the state of which can be read by the firmware running on the SVC. Normally, this signal would reflect the state of the other SVC's AOR. However, when the SVC is granted access ownership, its ASAOR would cleared to inactive, independent of the state of the other SVC's AOR, and remain in that state until read by the SVC firmware, after which it would go back to reflecting the state of the other SVC's AOR. FIG. 17 shows a timing diagram depicting the interaction between the various signals in this implementation.

Figure 18:
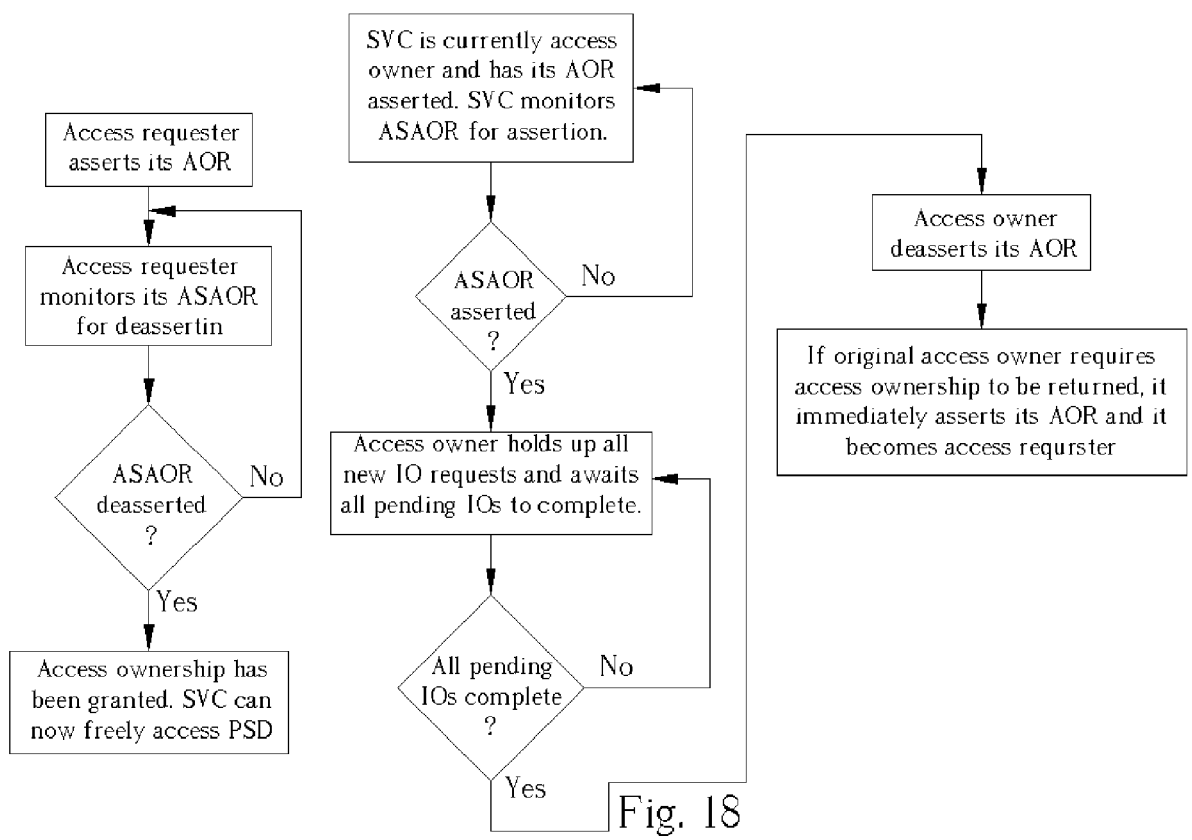
FIG. 18 is a flow chart for the switchover process depicted in FIG. 17.

In this mechanism, when a SVC wishes to assume ownership, it asserts it's AOR and then starts monitoring its ASAOR. When the SVC detects that its ASAOR is inactive, it knows it has been granted ownership and can proceed to access the PSD. It then keeps its AOR asserted until it wishes to relinquish access ownership, at which point it deasserts its AOR. During the period in which the SVC wishes to maintain access ownership, it addition to keeping its AOR asserted, it also monitors its ASAOR for assertion. If it detects assertion indicating that the other SVC wishes to assume ownership, at a "convenient" time, it would start waiting for any pending IO requests to complete while queuing any new IO requests. When all pending IO requests are complete, it would then relinquish ownership and deassert its AOR. If it wishes access ownership to be returned, as when there are new queued IO requests to be issued, it would immediately reassert its AOR. FIG. 18 depicts the flow described above.

Another possible communication mechanism is passing access ownership transfer requests and acknowledgements over communication channels that support the transfer of multiple bits and/or bytes of information. A set of inexpensive dedicated communication channels, such as 12C channels, can be implemented for the purpose of exchanging these requests and acknowledgements. Alternately, the implementation can take advantage of the existing inter-controller communication channel (ICC) that allows the two SVCs 200 in the redundant pair to communicate with each other to exchange these access ownership transfer requests and acknowledges as part of the normal state-synchronization information that gets exchanged between the two SVCs 200.

Figure 19:
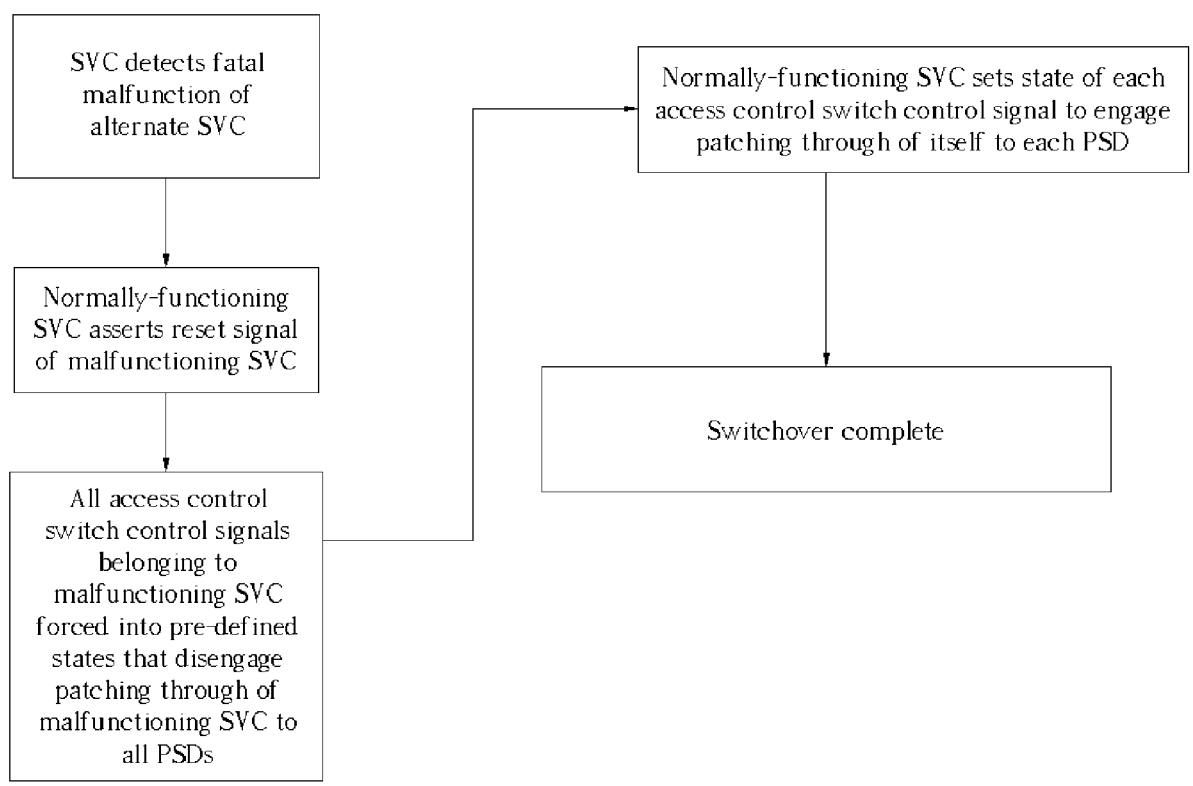
FIG. 19 is a flow chart of a mandatory switchover process when one SVC in the SVC pair malfunctions.

A condition under which switchover of access ownership would be mandated is when the access owner SVC 200 malfunctions in such a way that the alternate SVC 200 must take over its functions. FIG. 19 diagrams the process of switchover of the access ownership in this case. On detection of malfunction of the malfunctioning SVC 200, the alternate SVC 200 asserts the malfunctioning SVCs reset signal to completely incapacitate it and to force all external signal lines into pre-defined states. One such external signal line is the access control switch control signal of the malfunctioning SVC 200. On assertion of the SVC reset signal, this signal line is set to a state that enables the patching through of the surviving SVC 200 to the PSD 420. Following the assertion of the malfunctioning SVC reset signal, the surviving SVC 200 sets the state of its access control switch control signal to engage patching through of itself to the PSD 420. This completes the switchover process.

The access control switch 342 will remain in this state until the malfunctioning SVC 200 is replaced or brought back on line and requests ownership to be transferred over to it. The state of the access control switch signal line for each controller at reset, power-up, and during initialization remains such as to disable patching through of itself to the PSD 420 to insure that it does not interfere with potentially on-going PSD 420 accesses by the on-line SVC 200 by inadvertently forcing the access control switch 342 into a state that disrupts such accesses.

Figure 20:
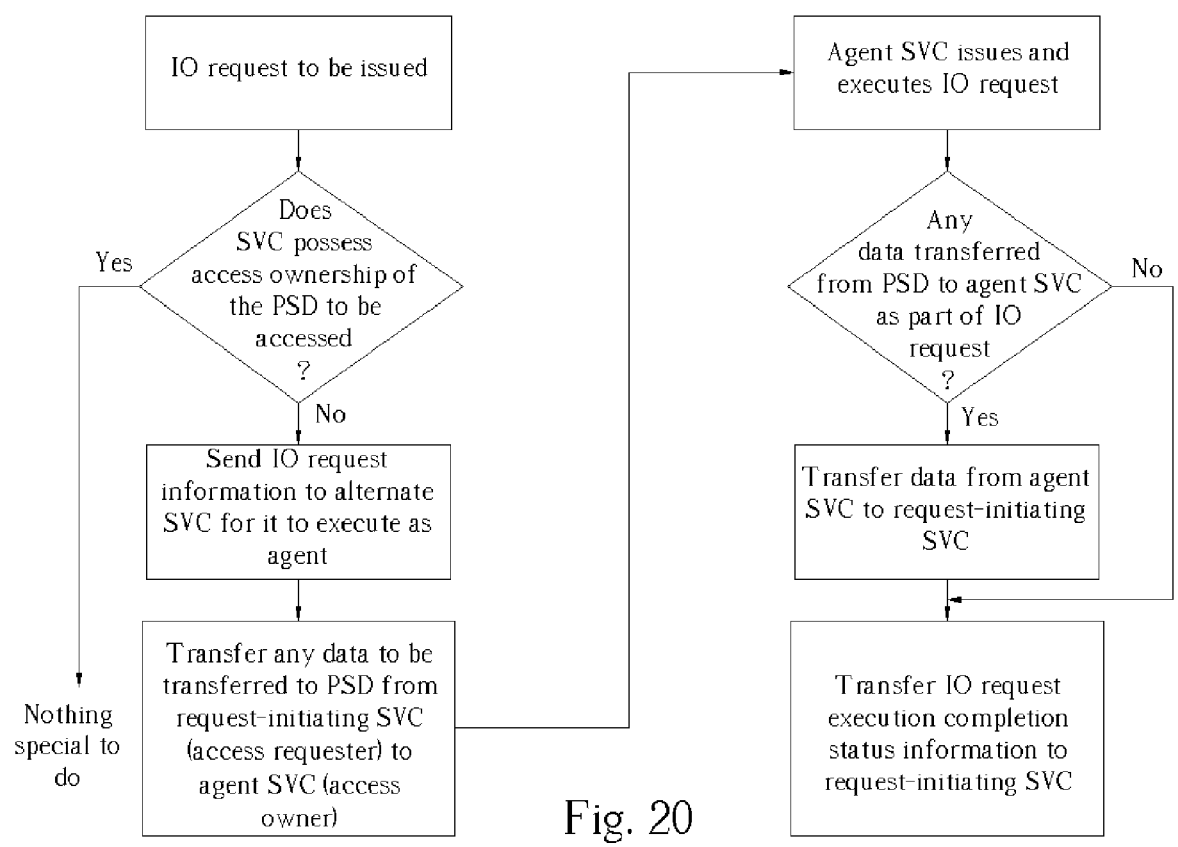
FIG. 20 is a flow chart of an IO request routing.

An alternate method of handling "occasional" access requirements on the part of the SVCs200 that does not normally have access ownership of the PSD 420 is to have the access owner act as an agent for issuing the IO requests that the SVC 200 requiring access, termed access requester, needs to have executed, an operation termed here as "IO Request Rerouting". This would typically entail transferring all the necessary IO request information to the access owner for it to construct into an IO request to issue to the PSD 420 for the access requester. In addition to the IO request information, the access requester would transfer any payload data to be written to the PSD to the access owner before or during IO request issuance and execution. Any payload data being read from the PSD would be transferred back to the access requester during or after IO request execution. Completion status of the operation, typically information that indicates whether the operation "succeeded" or "failed" and for what reason, would be passed back to the access requester on completion of the IO request execution. FIG. 20 depicts such a flow chart.

IO request rerouting function can be performed through a redundant IO device interconnect port pair. Each member port of the IO device interconnect port pair is provided on a separate SVC of the redundant SVC pair but connected to the same PSD through the IO device interconnect. A member port of the redundant IO device interconnect port pair can be a device-side IO device interconnect port, or a hybrid IO device interconnect port which acts as a device-side IO device interconnect port for some IO operations and as a host-side IO device interconnect port for other IO operations. In this regard, the member ports of the redundant IO device interconnect port pair could consist of point-to-point IO device interconnect ports, such as Serial ATA interconnects, or alternately, could consist of multiple-device IO device interconnect ports, such as Fibre Channel or Parallel SCSI interconnects. In addition, such IO request rerouting function can also be applied to the situation that IO requests are performed through the complementary expansion ports of the redundant SVC pair. The complementary expansion ports of the redundant SVC pair will be recited in further detail later with FIG. 21 through FIG. 32.

There are a couple of advantages of IO Request Rerouting over actually transferring access ownership back and forth in order to allow both SVCs 200 to have access to each PSD 420. Firstly, because of the nature of Serial ATA protocol, requiring a rather extended "bring-up" on the interconnect in going from a "down" state to an "up" state, there could be a significant latency between when an access requester receives ownership from the access owner and when it can actually start initiating PSD accesses. Secondly, the process of "downing" the SATA interface then bringing it back up again may result in the need for SATA interface circuitry on either side to enter states of abnormal condition handling. Occasionally, because abnormal condition handling procedures are typically not as thoroughly tested as normal condition processing, bugs may appear which may interfere with the successful rebring-up of the interconnect. To minimize this risk, it is good practice to try to minimize the occurrence of what either side would interpret and deal with as abnormal conditions, which, in this case would include minimizing the instances that access ownership needs be transferred.

One limitation of a "pure" Serial ATA SVC in which all of the device-side IO device interconnects are Serial ATA is that the number of PSDs that can be connected is limited by the number of device-side IO device interconnects that can be packed onto a single SVC. Because the SATA specification only allows for maximum signal line lengths of 1.5 m, the PSDs connected to one SVC must be packed close enough so that no signal line length exceeds 1.5 m. A typical SATA storage virtualization subsystem will only provide for connection of a maximum of 16 SATA PSDs because of these limitations. So a "pure" SATA storage virtualization subsystem is unable to match the expandability of a Fibre FC-AL storage virtualization subsystem, which would typically allow for connection of up to 250 PSDs via connection of external expansion chassis on the same set of device-side IO device interconnects.

In order to overcome this limitation, the current invention optionally includes one or more expansion device-side multiple-device IO device interconnects, herein referred to as device-side expansion ports, such as Parallel SCSI or Fibre FC-AL, on the SVC. These interconnects would typically be wired in such a way as to allow external connection of external expansion chassis. These chassis could be simple "native" JBODs of PSDs directly connected to the interconnect without any intervening conversion circuitry or could be intelligent JBOD emulation subsystems that emulate "native" JBODs using a combination of SATA or PATA PSDs and a single or redundant set of SVCs that provide the conversion from the multiple-device IO device interconnect protocol that provides the connection of the JBOD subsystem to the primary storage virtualization subsystem to the device-side IO device interconnect (SATA or PATA) protocol that provides the connection between the JBOD SVC(s) and the PSDs that they manage.

Figure 21:
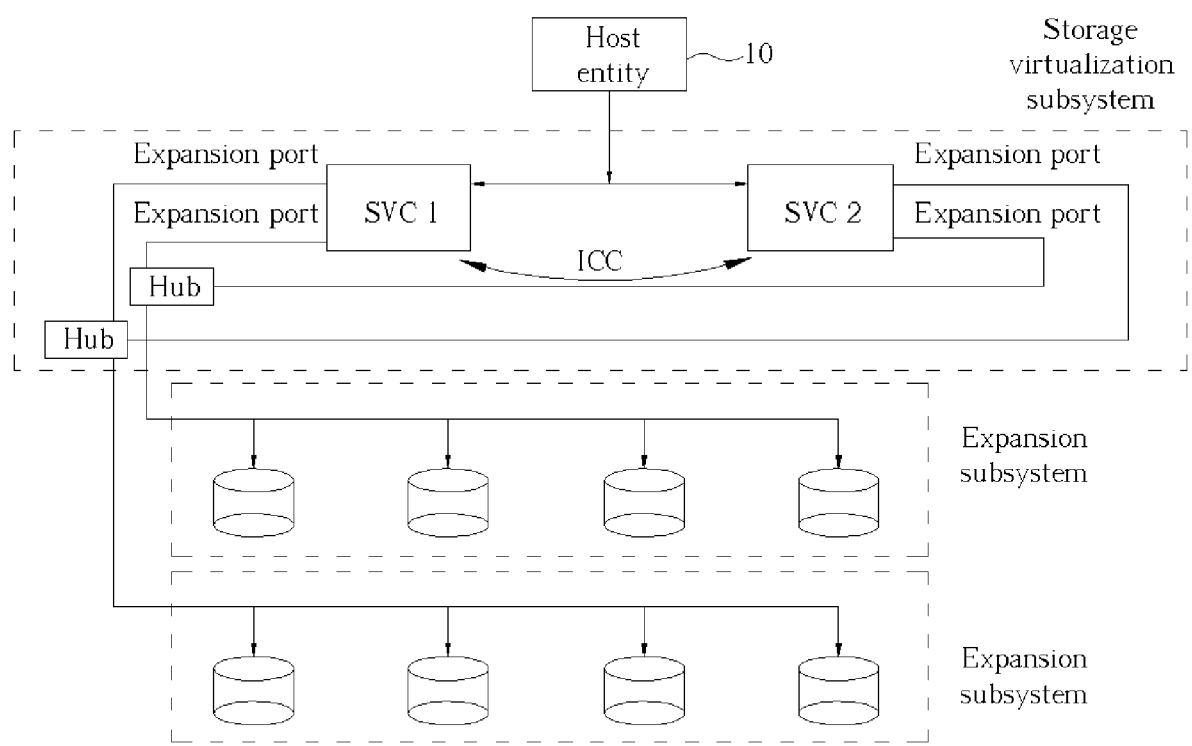
FIG. 21 is a block diagram of a redundant SVC interconnected expansion port implementation.

The current invention introduces three possible options for wiring of the device-side expansion ports. FIG. 21 depicts an implementation in which each device-side expansion port on one SVC is interconnected with its complement on the other SVC, referred to here as redundant SVC interconnected expansion port implementation. This allows both SVCs to share the device-side interconnect and the bandwidth it provides during normal operation and allows both SVCs full access to each storage unit port. It further allows either SVC to retain full access to all of the storage units, including those that were originally assigned to the alternate SVC, even in the event of an alternate SVC malfunction.

Figure 22:
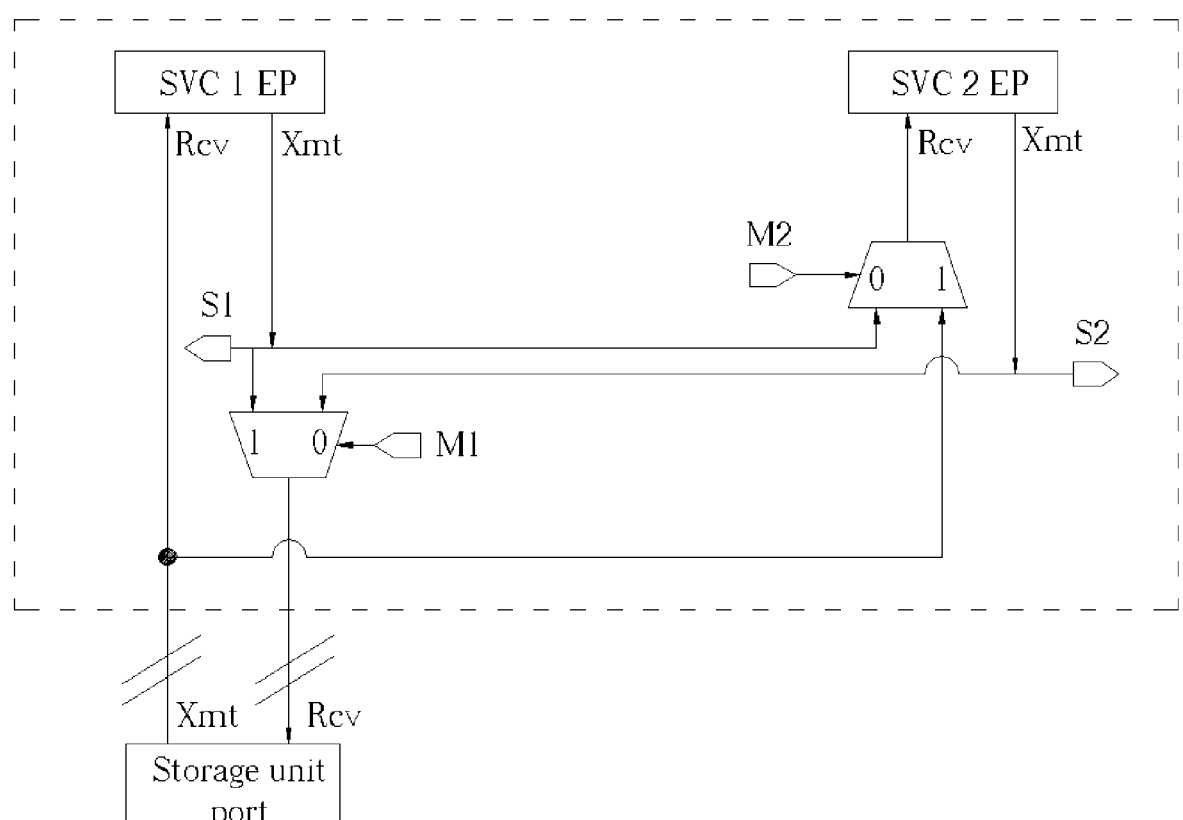
FIG. 22 is a block diagram showing how hardware switches might be employed to achieve a switchable interconnection.

FIG. 22 shows how hardware switches might be employed to achieve this kind of switchable interconnection with an expansion port of a loop-style multiple-device IO device interconnect such as Fibre FC-AL. During normal operation, the state of all of the switches would be "0" thereby interconnecting both SVCs onto the interconnect with the storage unit. If SVC1 malfunctioned, M2 would be set to "1" while keeping M1 cleared at "0" thereby bypassing SV1 and creating a direct connection from SVC2 to the storage units. If SVC2 malfunctioned, M1 would be set to "1" (M2 is "Don't Care") thereby bypassing SV2 and creating a direct connection from SVC1 to the storage units. This switching could be initiated by a hardware signal detection circuit (SDC) that detects whether or not there is a valid signal present on S1 or S2 or it could be initiated by one of the two SVCs when it detects a malfunction in the alternate SVC.

Figure 23:
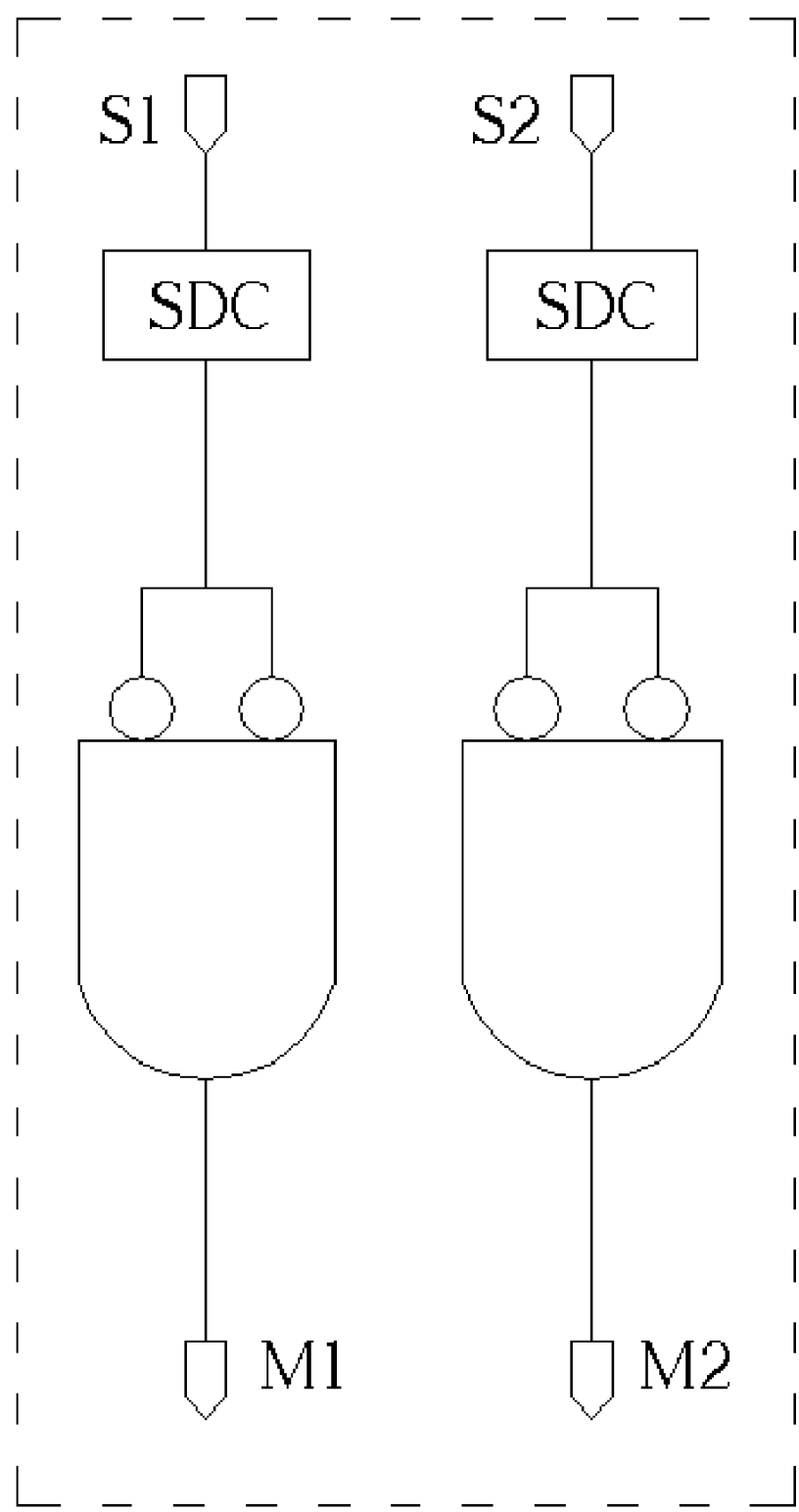
FIG. 23 shows a circuit design that relies on hardware signal detection to activate the switch state changes.
Figure 24:
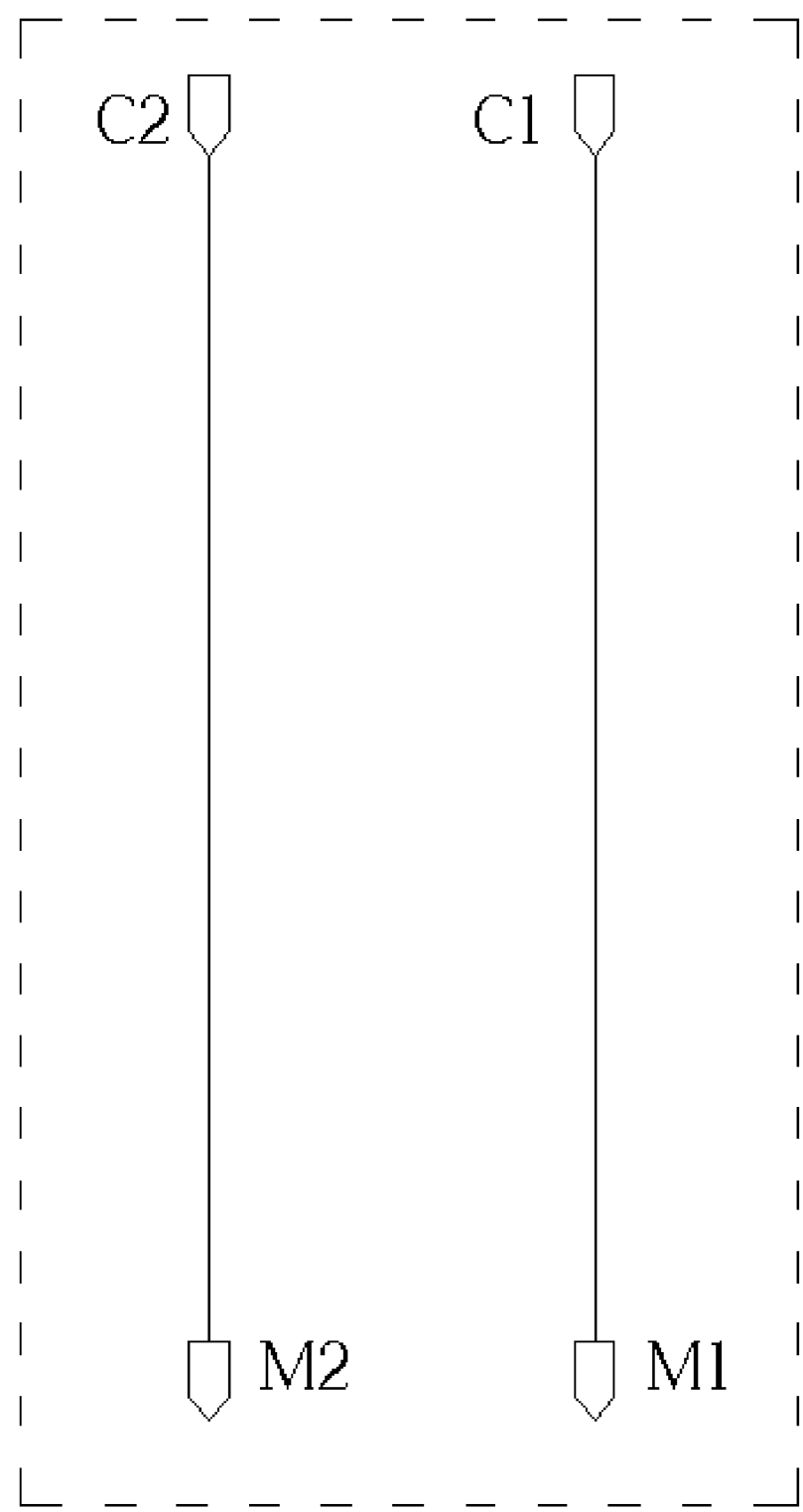
FIG. 24 shows a circuit design that takes input from the SVC1 and SVC2, C1 and C2 respectively, to trigger the switch state changes.
Figure 25:
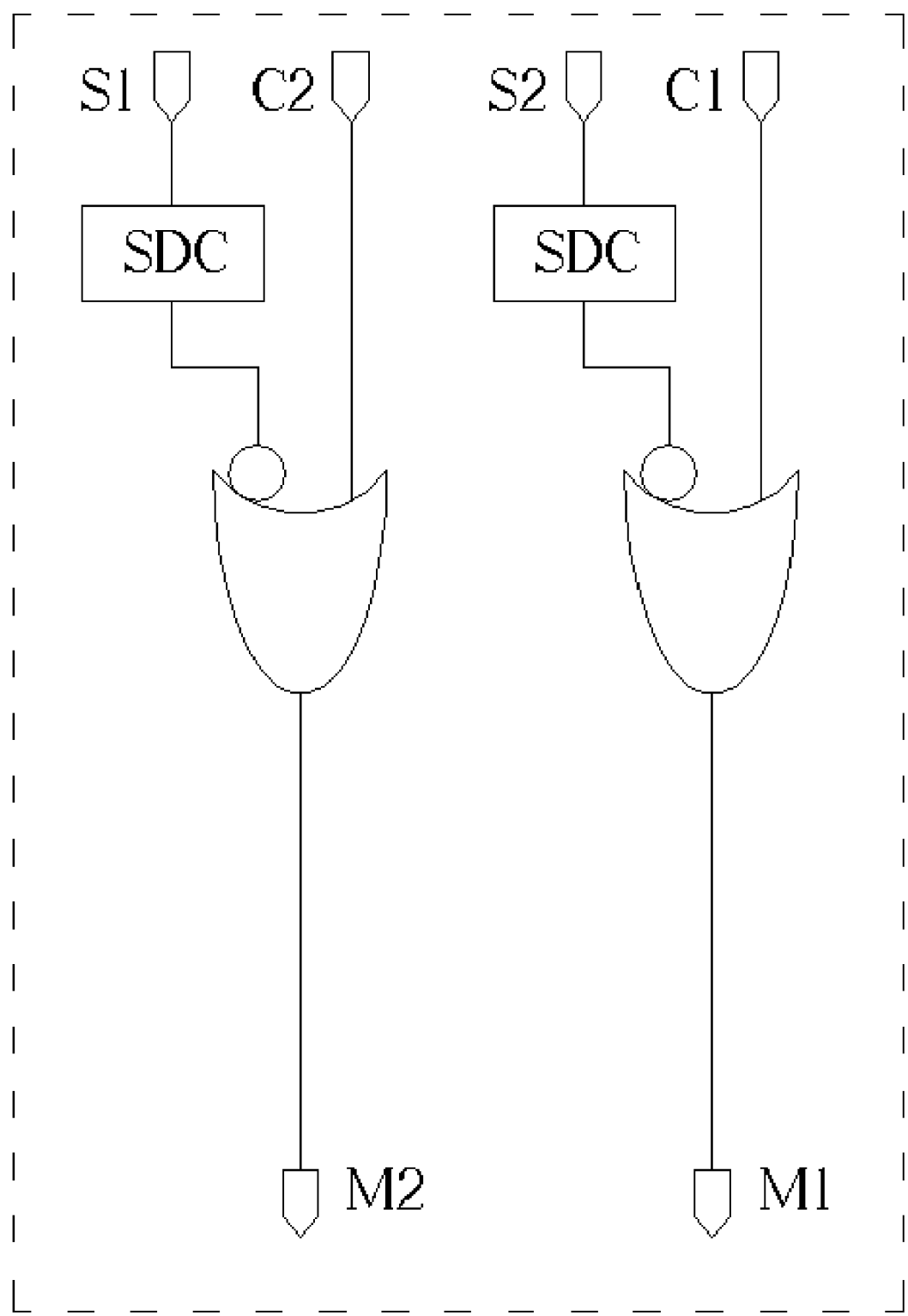
FIG. 25 shows a hybrid circuit of those shown in FIG. 23 and FIG. 24.

FIG. 23 shows a circuit design that relies on hardware signal detection to activate the switch state changes. FIG. 24 shows a circuit design that takes input from the SVC1 and SVC2, C1 and C2 respectively, to trigger the switch state changes. In this implementation, each control signal would be forced into a CLEAR ("0") state when its corresponding SVC is off line (corresponding circuitry not shown in figure) to avoid the consequences that might arise should the control signal be tri-state or floating and thereby potentially be interpreted by follow on circuitry as SET ("1"). FIG. 25 shows a hybrid of the two that supports switch state changes activated either by hardware signal detection or by input from the SVCs that offers greater flexibility than either one alone.

Figure 26:
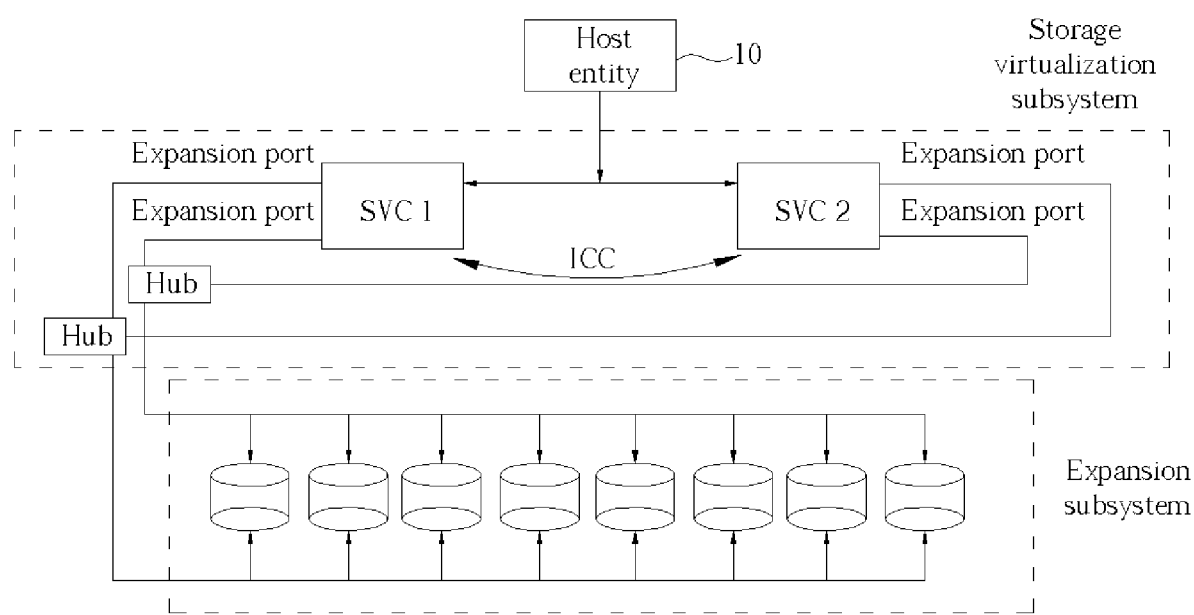
FIG. 26 is a block diagram of a redundant SVC interconnected redundant expansion port implementation.

An enhanced such implementation is depicted in FIG. 26, referred to here as the redundant SVC interconnected redundant expansion port implementation, would have pairs of redundant expansion ports rather than independent ports in order to keep a break or malfunctioning in an interconnect that services the expansion port of an SVC from causing a complete loss of access by the SVC to storage units connected on the interconnect. In such a configuration, each port in a redundant pair would connect to one of the ports in each of the dual-ported PSDs connected onto the interconnect or to one of the ports in a dual-ported storage virtualization subsystem that emulates a multiplicity of PSDs connected onto the interconnect (e.g., JBOD emulation storage virtualization subsystem). Should one of the expansion ports or the connected interconnects malfunction on an SVC, IO requests would be rerouted through the other expansion port/interconnect.

Figure 27:
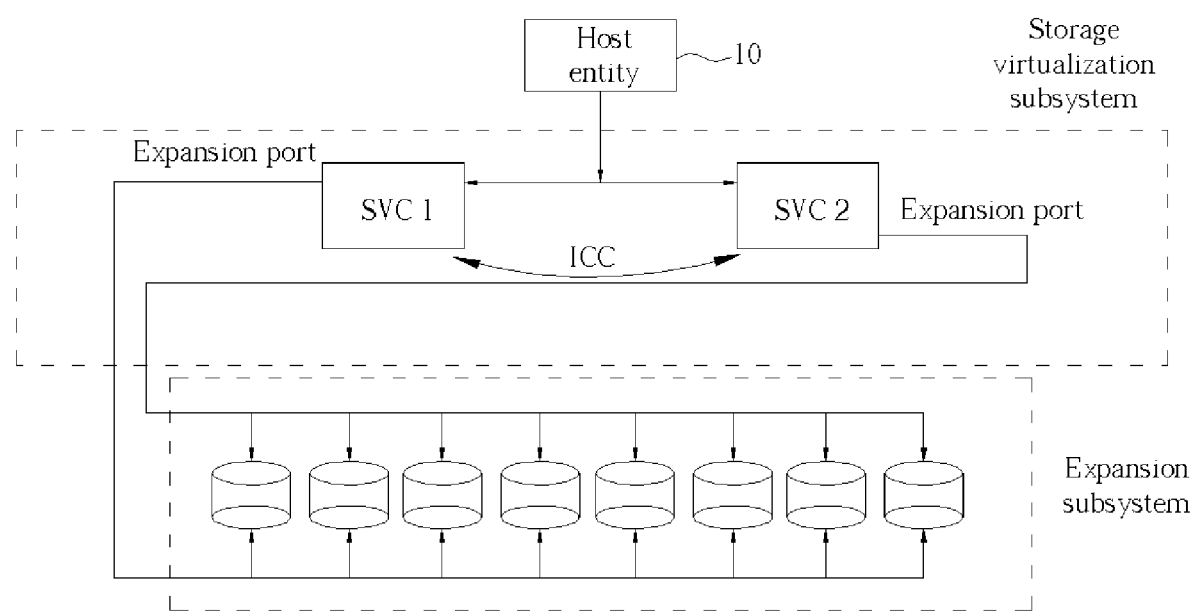
FIG. 27 is a block diagram of another redundant SVC interconnected expansion port implementation.

FIG. 27 depicts another possible implementation in which each expansion port on one SVC has a redundant complement on the other SVC. The expansion port on one SVC and its redundant complement on the other SVC are connected to the two ports of each dual-ported storage unit in such a way that one SVC's expansion port is connected to one port in the dual-ported pair and its complement on the other SVC to the other port. The complementary expansion ports are not interconnected but rather achieve redundancy by virtue of the dual-ported nature of each storage unit. However, dual-portedness of the storage units alone is not sufficient to support redundancy such that access by both SVCs can be maintained in the face of a malfunctioning expansion port on one of the SVCs or a malfunctioning interconnect connecting the expansion port on one of the SVCs to storage units. To achieve this, it is necessary to provide some mechanism for rerouting IO requests over to the interconnect that connects the alternate SVC to the storage units in the event that an SVC's own expansion port or the interconnect connecting it to the storage units malfunctions.

Figure 28:
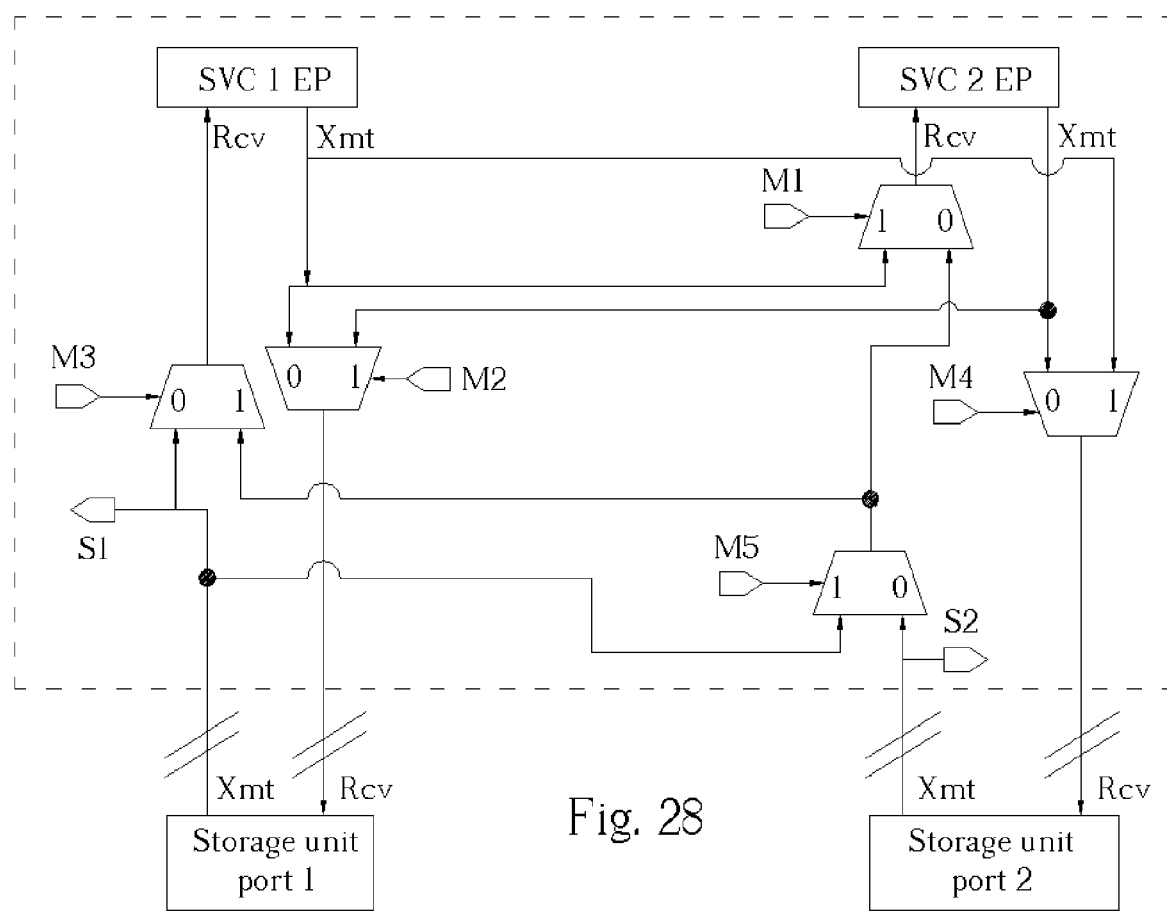
FIG. 28 is a block diagram showing an implementation that uses hardware switches to interconnect the two IO device interconnects connecting the two SVCs to the storage units shown in FIG. 27.

FIG. 28 depicts an implementation that uses hardware switches to interconnect the two IO device interconnects connecting the two SVCs to the storage units shown in FIG. 27 in the event of a break or malfunctioning of the portion of interconnect that runs between the SVS and the storage units. This portion of the interconnect would typically be a cable that runs between chassis and is especially vulnerable to breaks. In FIG. 28, the state of all of the switches would be "0" during normal operation, that is, operation in which all interconnects are functioning properly. Signals from the expansion ports are routed directly to an associated port in the storage unit, referred to as the default path, so that each complementary expansion-port/interconnect in the redundant pair, one on each SVC, can operate completely independently without interference of any kind.

When it becomes necessary to route all IOs from both SVCs' expansion ports to Storage Unit Port 1 due to a break in the interconnect connecting to Storage Unit Port 2 or perhaps a malfunction in Storage Unit Port 2 itself, M1 and M2 would be set to 1 while M3 would remain clear at 0 and M4 and M5 are "Don't Care". To route all IOs from both SVCs expansion ports to Storage Unit Port 2, M1 and M3 would be set to 1 while M4 and M5 would remain clear at 0 and M2 is "Don't Care". If SVC1 goes off line, to route IOs from SVC2 directly to Storage Unit Port 2, M1, M4, and M5 would remain clear at 0 while M2 and M3 are "Don't Care". If, in addition to SVC1 going off line there is also a break in the interconnect to Storage Unit Port 2 or perhaps a malfunction in the port itself, then IOs from SVC2 would need to be routed to Storage Unit Port 1. This would be done by setting M5 and M2 to 1 while M1 remains clear at 0 and M3 and M4 are "Don't Care". Conversely, if SVC2 goes off line, to route IOs from SVC1 directly to Storage Unit Port 1, M2 and M3 would remain clear at 0 while M1, M4, and M5 are "Don't Care". If, in addition to SVC2 going off line there is also a break in the interconnect to Storage Unit Port 1 or perhaps a malfunction in the port itself, then IOs from SVC1 would need to be routed to Storage Unit Port 2. This would be done by setting M3 and M4 to 1 while M5 remains clear at 0 and M1 and M2 are "Don't Care". The table shown in FIG. 42 summarizes the switch settings for the various possible scenarios.

Figure 29:
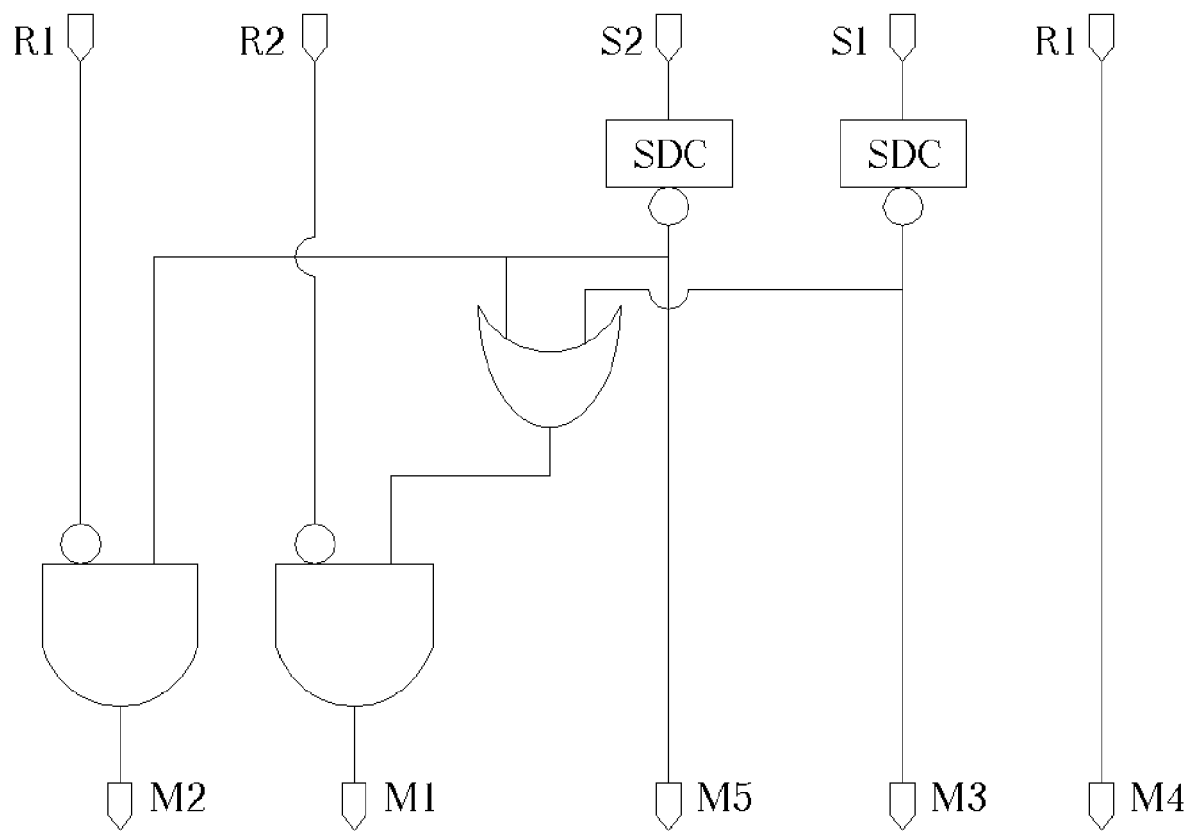
FIG. 29 shows a circuit design that relies on hardware signal detection to activate the switch state changes of hardware switches shown in FIG. 28.
Figure 30:
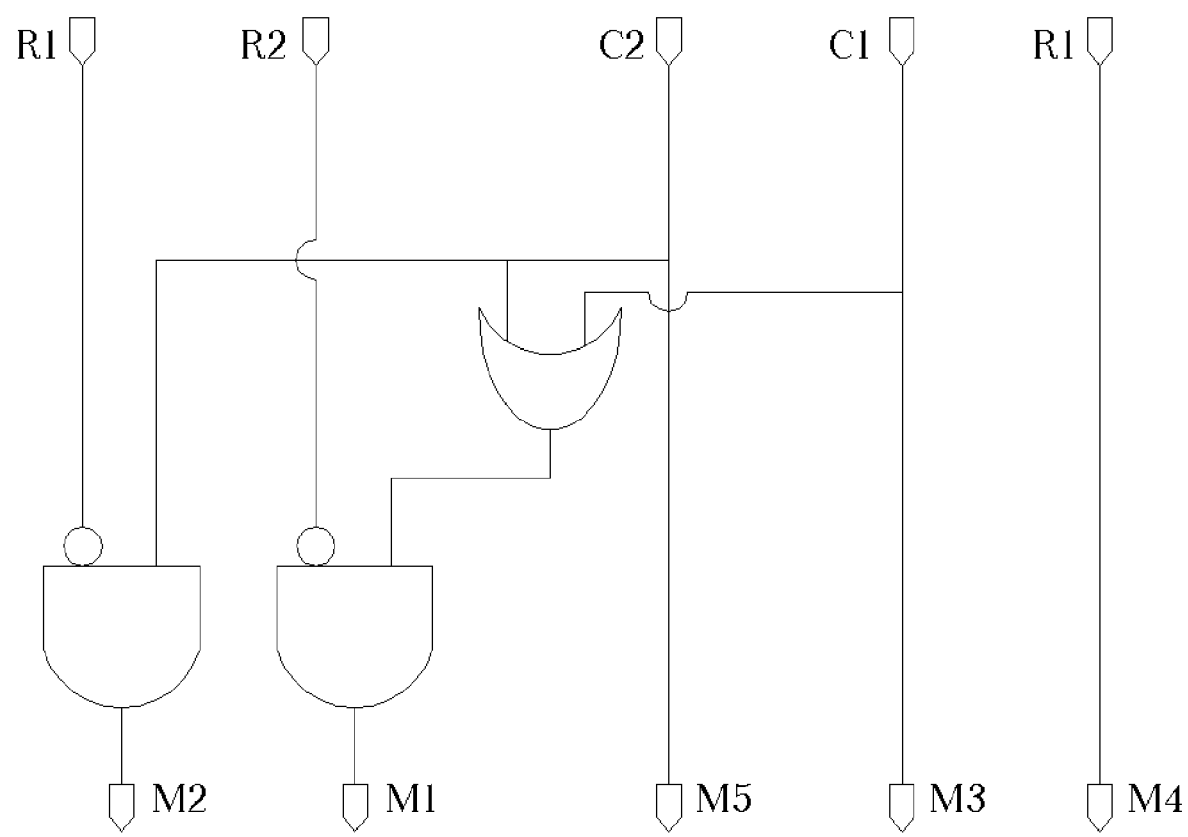
FIG. 30 shows a circuit design that takes input from the SVC1 and SVC2, C1 and C2 respectively, to trigger the switch state changes of hardware switches shown in FIG. 28.
Figure 31:
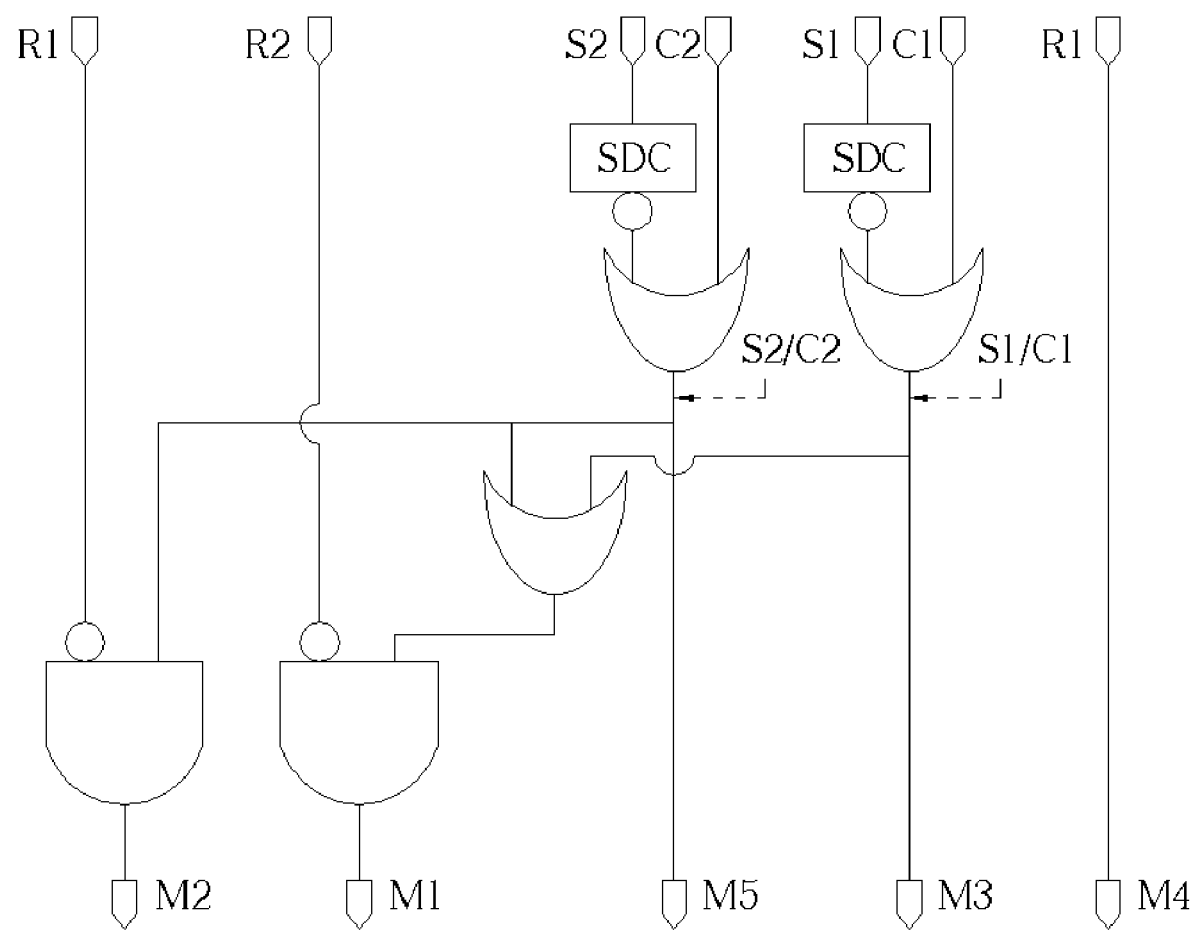
FIG. 31 shows a hybrid circuit of those shown in FIG. 29 and FIG. 30.

The switching could be initiated by a hardware signal detection circuit (SDC) that detects whether or not there is a valid signal present on S1 or S2 or it could be initiated by one of the two SVCs when it detects a break or malfunction in the default path. FIG. 29 shows a circuit design that relies on hardware signal detection to activate the switch state changes (a truth table for the circuit is shown in FIG. 43). In this figure, R1 is an override signal that allows SVC1 to forcibly take control of the state of the switches in the event that SVC2 and/or associated circuitry malfunction. Similarly, R2 is an override signal that allows SVC2 to forcibly take control of the state of the switches in the event that SVC1 and/or associated circuitry malfunction. FIG. 30 shows a circuit design that takes input from the SVC1 and SVC2, C1 and C2 respectively, to trigger the switch state changes (a truth table for the circuit is shown in FIG. 44). In this case, setting C1 by SVC1 is an indication that its IO requests should be routed through Storage Unit Port 2 instead of the default Storage Unit Port 1 while setting C2 by SVC2 is an indication that its IO requests should be routed through Storage Unit Port 1 instead of the default Storage Unit Port 2. FIG. 31 shows a hybrid of the two that supports switch state changes activated either by hardware signal detection or by input from the SVCs that offers greater flexibility than either one alone (a truth table for the circuit is shown in FIG. 45).

Yet another option for wiring of device expansion ports in the configuration depicted in FIG. 27 is without any interconnection at all. In this case, redundancy can be achieved by rerouting IO requests from one SVC to the other and out the surviving complementary expansion-port/device-side-interconnect over the inter-SVC communication interconnect that is normally used for synchronizing the mutual states of the two SVCs with each other.

Figure 32:
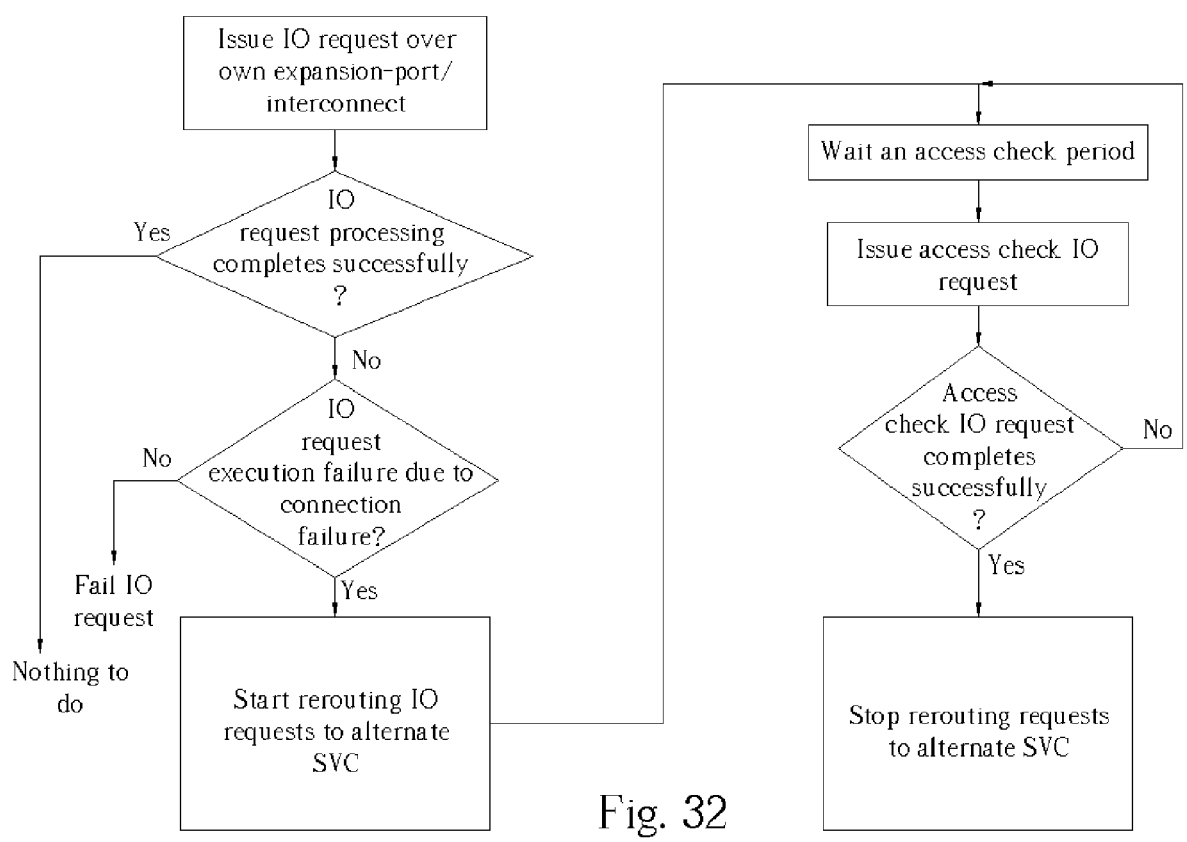
FIG. 32 is a flow chart of an IO request routing in a redundant SVC interconnected expansion port implementation.

When an SVC detects that a storage unit connected on an IO device interconnect that connects to one of its expansion ports can no longer be accessed, whether it is due to a detected break/malfunction in the expansion-port/interconnect or some other cause, the detecting SVC passes the IO request to the alternate SVC for the alternate SVC to issue to the same storage unit via the complementary expansion-port/interconnect and alternate storage unit port. Any data/status associated with the IO request is transferred between the two SVCs during the execution of the IO request. If the expansion-port/interconnect on the alternate SVC appears to be up and functioning normally yet access to the storage unit fails on the alternate SVC also, the storage unit would be considered as having failed or having been removed. If access succeeds, then the loss of access would be considered to be localized to the original SVC and IO requests associated with future accesses to the storage unit are automatically rerouted to the alternate SVC for issuance over the complementary expansion-port/interconnect. During this time, the original SVC monitors the accessibility of the storage unit via its expansion-port/interconnect typically by periodically issuing internally generated IO requests that check the state of the interconnect and storage unit. If, at some point, the original SVC discovers that the storage unit can now be accessed over its expansion-port/interconnect, it will stop rerouting IO requests to the alternate SVC and start issuing them directly over its own expansion-port/interconnect again. FIG. 32 shows a flow chart of this process.

Another feature that an SVC might typically implement is redundancy in the host-side interconnects in which multiple host-side interconnect ports are included on the SVC and LMUs are presented to the host identically over two or more of these interconnects. This feature is designed to allow the host the ability to maintain access to the LMU even if one of the interconnects and/or ports on the interconnect should break, become blocked, or otherwise malfunction.

Figure 33:
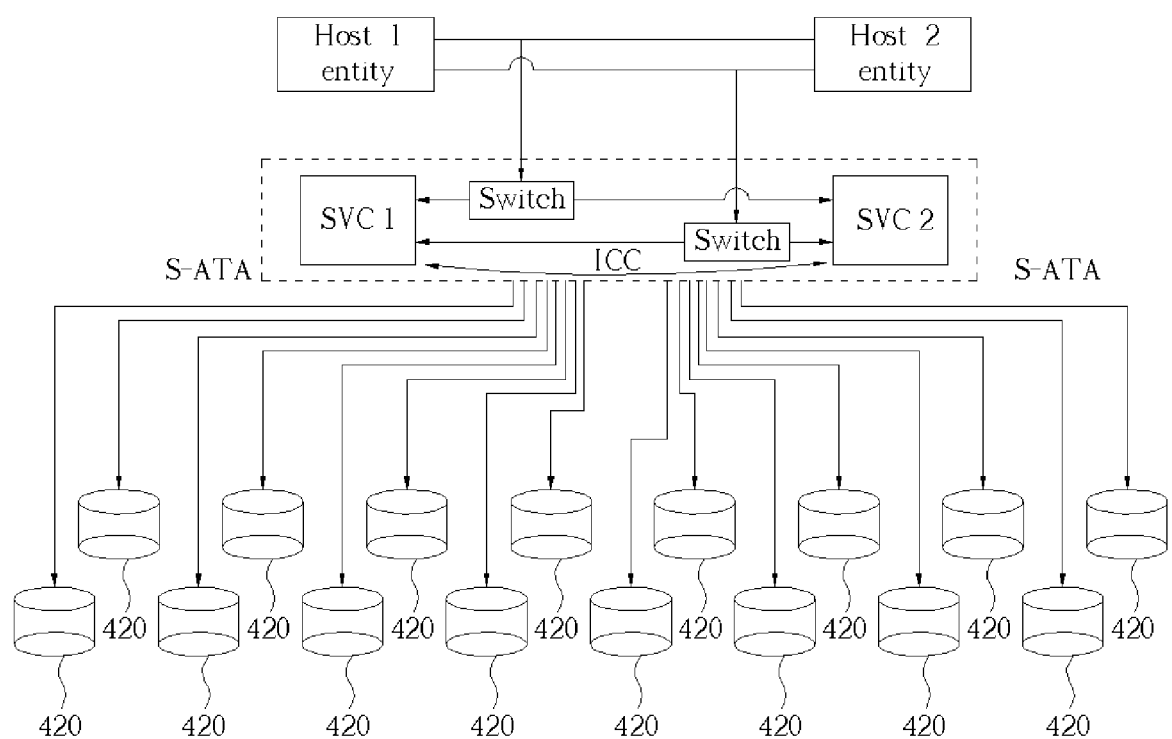
FIG. 33 is a block diagram of a redundant external storage virtualization computer system comprising two separate host-side ports on each SVC connecting to two entirely separate host-side IO device interconnects and host ports.

FIG. 33 depicts a redundant external storage virtualization computer system comprising two separate host-side ports on each SVC connecting to two entirely separate host-side IO device interconnects and host ports. Each port on one SVC has a complementary port on the alternate SVC to which it is interconnected. In a typical implementation supporting redundancy in the host-side interconnects, each SVC would present the same set of logical media units in an identical fashion on both of its ports.

Under normal operation, host(s) can access logical media units through an SVC that is configured to present the LMU over a host-side interconnect. This can be one SVC or both of the SVCs in the redundant pair. If one SVC were to malfunction, logical media units that were already being presented to the host(s) by both SVCs would remain accessible through the normally-functioning SVC and, with the help of special purpose "multiple-redundant-pathing" functionality on the host, on detection that IO request processing through one of the SVCs is disrupted, the IO requests would be completely routed to the normally-functioning SVC.

Those LMUs that were originally only being presented to the host by the SVC that is now malfunctioning would immediately be presented to the host(s) by the normally-functioning SVC over host-side interconnects that connect it to the hosts. For these LMUs, the normally-functioning SVC would be able to transparently take over the processing of host IO requests simply by presenting itself on each interconnect, together with all the reassigned logical media units, in an identical way to what the malfunctioning SVC did prior to its malfunctioning. With this kind of "transparent takeover", the host need not implement special functionality to make it aware of the SVC malfunctioning and reroute IOs itself in response.

In addition to SVC redundancy, the two sets of complementary ports in turn form a redundant port complement. A host that has two independent ports connected using two separate IO device interconnects to these two complementary redundant port sets then has two independent paths to each logical media unit over which it can issue IO requests. Should one of the ports on the host or on an SVC malfunction or should the IO device interconnect itself break or become blocked, the hosts implementing multiple-redundant-pathing functionality can reroute IO requests over the other redundant path. Alternately, when both paths are functioning normally, the host can elect to issue IO requests over both paths in an effort to balance the load between the paths, a technique referred to as "load balancing".

Figure 34:
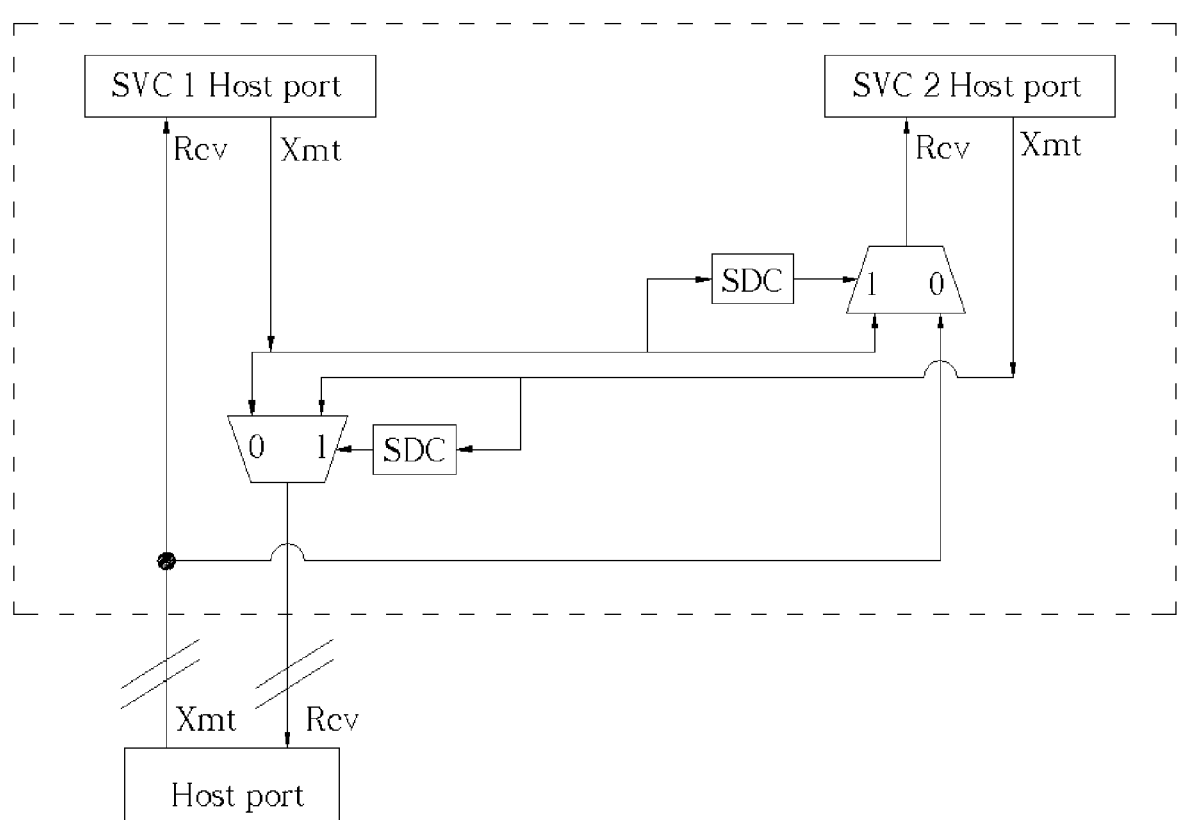
FIG. 34 is a block diagram showing an example of a switch circuit that can be used to accomplish the host side interconnection of FIG. 33.

To achieve the transparent takeover functionality described above, each of the pair of ports, one on each SVC, that form a complementary port pair are physically interconnected. For bus-style multiple-device IO device interconnects such as Parallel SCSI, the interconnection simply consists of wiring the devices together directly without any intervening circuitry. For other types of interconnects, special switch circuitry may be required to achieve the physical interconnection required. FIG. 34 shows an example of a switch circuit that can be used to accomplish this interconnection for Fibre interconnects in which hardware signal detection (SDC) is used to activate the switch state changes.

Figure 35:
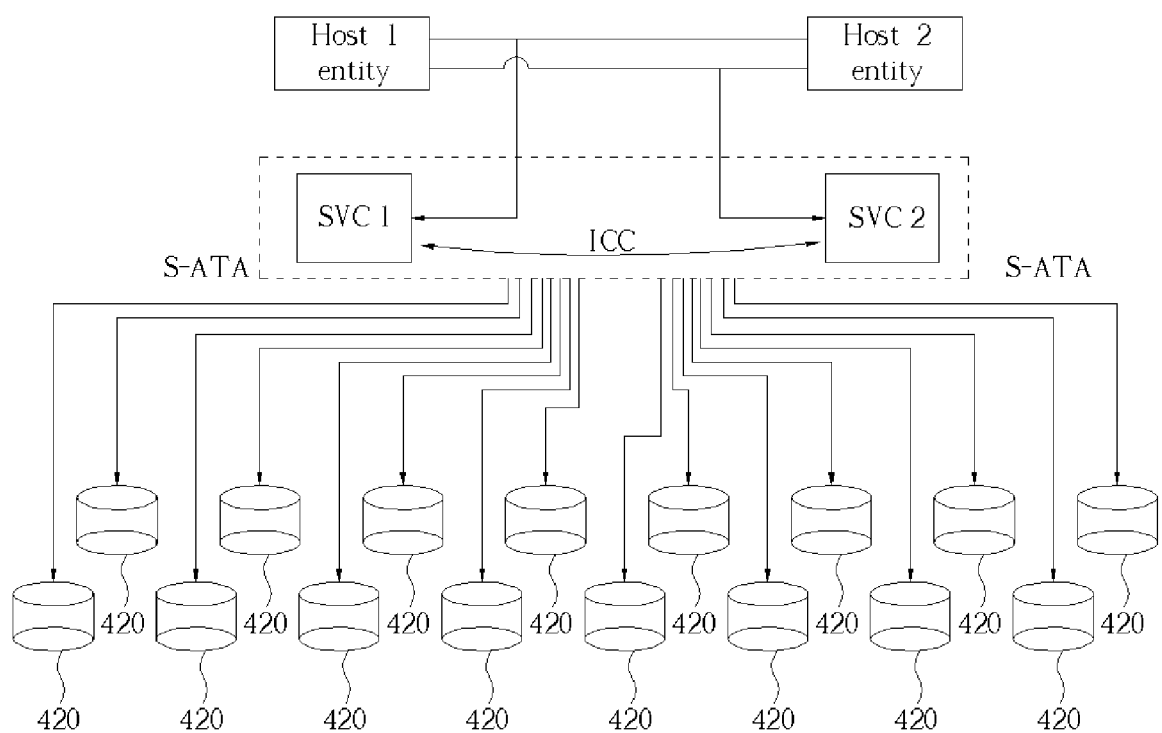
FIG. 35 is a block diagram of a redundant external storage virtualization computer system comprising one host-side port on each SVC connecting to one host-side IO device interconnect and host ports.

In configurations in which the hosts implement multiple-redundant-pathing functionality, there is an alternate host-side interconnect configuration that requires fewer interconnects to achieve similar levels of redundancy as shown in FIG. 35. Note that host-side interconnects connecting an SVC to the hosts are not interconnected to the alternate SVC. In this configuration, interconnect redundancy is achieved by making each LMU accessible to the hosts over a host-side interconnect of one SVC also accessible through an alternate host-side interconnect on the alternate SVC. Should one of the interconnects break, become blocked, or otherwise malfunction, the hosts would still be able to access the LMU through the alternate SVC via the alternate interconnect. Similarly, should one of the SVCs malfunction, the other SVC can take over and, once again, the hosts would still be able to access the LMU through the normally-functioning SVC via the alternate interconnect.

A variation on the Redundant Serial ATA storage virtualization Subsystem uses Parallel ATA PSDs rather than Serial ATA PSDs. For each PSD, it incorporates a SATA-to-PATA conversion circuit that resides in close proximity to the PATA PSD between the access control switch and the PSD and typically together with the access control switch in the same FRU. This conversion circuit converts SATA signals and protocol to PATA and back again in the opposite direction. The importance of a Redundant Serial ATA SVS that uses Parallel ATA PSDs lies in the fact that, in the short term, supplies of Serial ATA drives will still be relatively short compared to Parallel ATA and Serial ATA drives will still be significantly more expensive. During this transitional period, this kind of a subsystem would allow PATA PSDs to be substituted for SATA PSDs, eliminating the concerns over SATA PSD supply and cost. Such a subsystem would typically place the conversion circuit, together with the access control switch, in the removable canister in which the PSD resides. The removable canister allows the PSD and any related circuitry to be easily swapped out in the event of that a PSD and/or related circuitry needs servicing. By placing the conversion circuit in the canister, when SATA drives become readily available at a competitive price point, the entire canister contents could be swapped out with a SATA PSD and SATA related circuitry.

Figure 37:
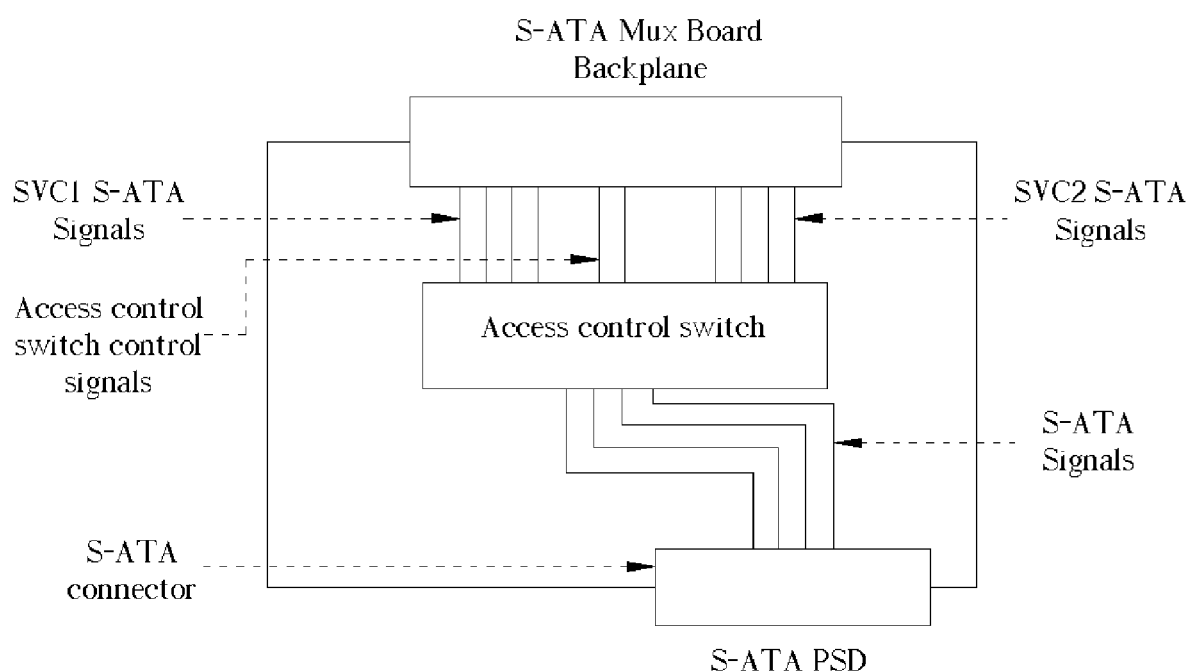
FIG. 37 is a block diagram includes more details of the individual PCBs in the canister of FIG. 36.
Figure 39:
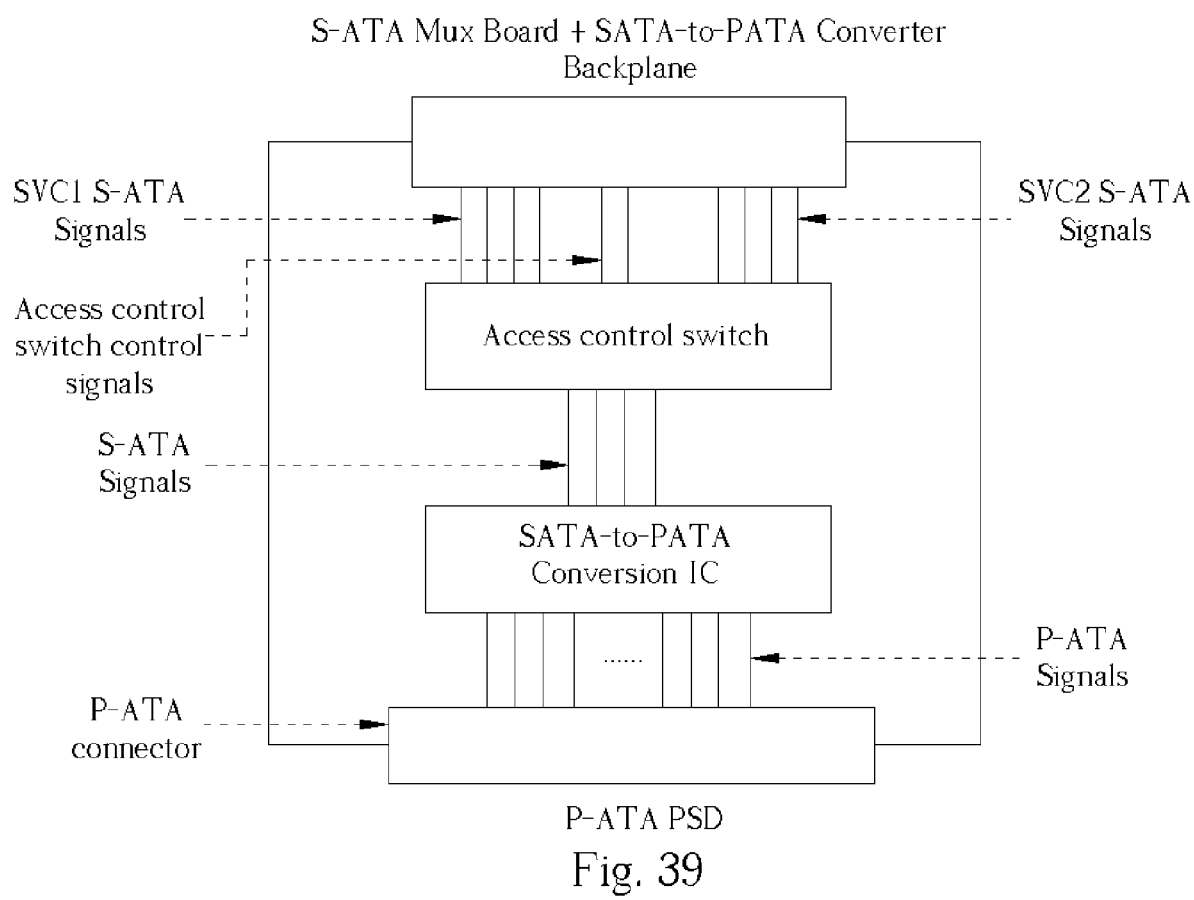
FIG. 39 is a block diagram includes more details of the individual PCBs in the canister of FIG. 38.

Please refer to FIG. 36 and FIG. 38. FIG. 36 depicts a block diagram of a removable redundant SATA-PSD canister. FIG. 37 includes more detailed block diagrams of the individual PCBs in the canister on which the access control switch is situated. FIG. 38 depicts a block diagram of a removable redundant PATA-PSD canister. FIG. 39 includes more detailed block diagrams of the individual PCBs in the canister on which the access control switch and SATA-to-PATA conversion circuits are situated. They both have a pair SATA IO device interconnects and a set of access control switch control signals coming in from the two SVCs connecting into an access control switch circuit. The primary difference is in the presence of a SATA-to-PATA conversion circuit in the removable PATA-PSD canister which is otherwise absent in the removable SATA-PSD canister.

Those skilled in the art will readily observe that numerous modifications and alternations of the device may be made while retaining the teaching of the invention. Accordingly, the above disclosure should be construed as limited only by the metes and bounds of the appended claims.

What is claimed is:

1. A computer system comprising:
   a host entity for issuing IO requests;
   a redundant external storage virtualization controller (SVC) pair for performing IO operations in response to IO requests issued by the host entity comprising a first and a second external storage virtualization controller coupled to the host entity; and
   a set of at least one physical storage device for providing storage to the computer system, with at least one member of said set of at least one physical storage device comprising a PSD coupled to the said redundant storage virtualization controller pair through a point-to-point serial signal interconnect;
   wherein when one storage virtualization controller in the said redundant SVC pair is not on line or goes off line after being on line, the other storage virtualization controller in the said redundant SVC pair will automatically take over the functionality originally performed by the said one storage virtualization controller in the redundant SVC pair; and
   wherein in the redundant storage virtualization controller pair, each of the storage virtualization controllers further comprises:
   a central processing circuitry for performing the IO operations in response to IO requests of said host entity;
   at least one IO device interconnect controller coupled to said central processing circuitry;
   at least one host-side IO device interconnect port provided in a said at least one IO device interconnect controller for coupling to said host entity; and
   at least one device-side IO device interconnect port provided in a said at least one IO device interconnect controller coupled to said at least one physical storage device through said point-to-point serial-signal interconnect.

2. The redundant storage virtualization computer system of claim 1 wherein said point-to-point serial signal interconnect is a Serial ATA IO device interconnect.

3. The storage virtualization computer system of one of claims 1 and 2 wherein a said host-side IO device interconnect port and a said device-side IO device interconnect port are provided in the same said IO device interconnect controller.

4. The storage virtualization computer system of one of claims 1 and 2 wherein a said host-side IO device interconnect port and a said device-side IO device interconnect port are provided in different said IO device interconnect controllers.

5. A redundant storage virtualization subsystem for providing storage to a host entity, comprising:
   a redundant external storage virtualization controller (SVC) pair for performing IO operations in response to IO requests issued by the host entity comprising a first and a second storage virtualization controller for coupling to the host entity; and
   a set of at least one physical storage device for providing storage to the host entity, with at least one member of said set of at least one physical storage device comprising a PSD coupled to the said redundant storage virtualization controller pair through a point-to-point serial signal interconnect;
   wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair;
   wherein for each of at least one of the said physical storage devices, the redundant storage virtualization subsystem further comprises an access control switch coupled between said physical storage device and the redundant storage virtualization controller pair for selectively switching the connection of the said physical storage device to the redundant SVC pair between the first and the second storage virtualization controller; and wherein at least one said PSD together with said access control switch is installed in a canister removably attached to the redundant storage virtualization subsystem.

6. The redundant storage virtualization subsystem of claim 5 wherein the said point-to-point serial signal interconnect is a Serial ATA IO device interconnect.

7. A redundant storage virtualization subsystem for providing storage to a host entity, comprising:
  a redundant external storage virtualization controller (SVC) pair for performing operations in response to IO requests issued by the host entity comprising a first and a second storage virtualization controller for coupling to the host entity; and
  a set of at least one physical storage device for providing storage to the host entity, with at least one member of said set of at least one physical storage device comprising a PSD coupled to the said redundant storage virtualization controller pair through a point-to-point serial signal interconnect;
  wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair;
  wherein for each of at least one of the said physical storage devices, the redundant storage virtualization subsystem further comprises an access control switch coupled between said physical storage device and the redundant storage virtualization controller pair for selectively switching the connection of the said physical storage device to the redundant SVC pair between the first and the second storage virtualization controller; and
  wherein said access control switch coupled between a said physical storage device and the redundant storage virtualization controller pair selectively allows patching through of the serial signal of the said physical storage device to and from the first SVC when in a first patching state of said access control switch and to and from the second SVC when in a second patching state of said access control switch.

8. The redundant storage virtualization subsystem of claim 7 wherein the said point-to-point serial signal interconnect is a Serial ATA IO device interconnect.

9. The redundant storage virtualization subsystem of one of claims 7 and 8, wherein an access ownership arbitration mechanism is provided between said SVC pair and said access control switch to control the patching state of said access control switch.

10. The redundant storage virtualization subsystem of claim 9, wherein said access ownership arbitration mechanism comprises a pair of access request signal lines coupled between said SVC pair, said first SVC being active on a first of said access request signal line pair and passive on a second of said access request signal line pair; said second SVC being active on said second and passive on said first of said access request signal line pair; and said SVC pair each being capable of issuing an access request signal on its own said-active access request signal line, and reading a requesting state on its own said passive access request signal line and identifying a change of said requesting state since previous reading on its own said passive access request signal line.

11. The redundant storage virtualization subsystem of claim 9, wherein said access ownership arbitration mechanism includes an access ownership detecting mechanism to determine if access ownership is possessed by a said SVC.

12. The redundant storage virtualization subsystem of claim 9, wherein said access ownership arbitration mechanism includes an access ownership granting mechanism to grant access ownership when said access ownership is requested by a said SVC.

13. The redundant storage virtualization subsystem of claim 9, wherein said access ownership arbitration mechanism comprises an access ownership arbitration circuit (AOAC) coupled to said first and second SVCs and said access control switch, and wherein if said first SVC issues a first access ownership request signal received by said AOAC, access ownership will be granted to said first SVC when said second SVC does not already possess the access ownership, and if said second SVC issues a second access ownership request signal received by said AOAC, access ownership will be granted to said second SVC when said first SVC does not already possess the access ownership.

14. The redundant storage virtualization subsystem of claim 13, further comprises an access ownership determining mechanism whereby when said first and said second SVC concurrently issue said first and second access ownership request signals to said AOAC, access ownership will he granted to a predetermined one of said SVC pair.

15. A redundant storage virtualization subsystem for providing storage to a host entity, comprising:
  a redundant external storage virtualization controller (SVC) pair for performing IO operations in response to IO requests issued by the host entity comprising a first and a second storage virtualization ion controller for coupling to the host entity; and
  a set of at least one physical storage device for providing storage to the host entity, with at least one member of said set of at least one physical storage device comprising a PSD coupled to the said redundant storage virtualization controller pair through a point-to-point serial signal interconnect;
  wherein when one storage virtualization controller in the said redundant SVC pair is not on line or goes off line after being on line, the alternate storage virtualization controller in the said redundant SVG pair will automatically take over the functionality originally performed by the said one storage virtualization controller in the redundant SVC pair;
  wherein for each of at least one of the said physical storage devices, the redundant storage virtualization subsystem further comprises an access control switch coupled between said physical storage device and the redundant storage virtualization controller pair for selectively switching the connection of the said physical storage device to the redundant SVC pair between the first and the second storage virtualization controller; and
  further comprising a cooperating mechanism for the redundant SVC pair to cooperatively control a patching state of said access control switch; a monitoring mechanism for each SVC of said SVC pair to monitor status of the other SVC of said SVC pair; and, a state control mechanism for each SVC of said SVC pair to forcibly take complete control of said access control switch independent of the state the other SVC of said SVC pair.

16. The redundant storage virtualization subsystem of claim 15 wherein the said point-to-point serial signal interconnect is a Serial ATA IO device interconnect.

17. A redundant storage virtualization subsystem for providing storage to a host entity, comprising:
- a redundant external storage virtualization controller (SVC) pair for performing IO operations in response to IO requests issued by the host entity comprising a first and a second storage virtualization controller for coupling to the host entity; and
- a set of at least one physical storage device for providing storage to the host entity, with at least one member of said set of at least one physical storage device comprising a PSD coupled to the said redundant storage virtualization controller pair through a point-to-point serial signal interconnect;
- wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and
- wherein in the redundant storage virtualization controller pair, each of the storage virtualization controllers further comprises:
- a central processing circuitry for performing IO operations in response to IO requests of said host entity;
- at least one IO device interconnect controller coupled to said central processing circuitry;
- at least one host-side IO device interconnect port provided in a said at least one IO device interconnect controller for coupling to said host entity; and
- at least one device-side IO device interconnect port provided in a said at least one IO device interconnect controller coupled to at least one physical storage device through a point-to-point serial-signal interconnect.

18. The redundant storage virtualization subsystem of claim 17 wherein the said point-to-point serial signal interconnect is a Serial ATA IO device interconnect.

19. The redundant storage virtualization subsystem of one of claims 17 and 18 wherein a said host-side IO device interconnect port and a said device-side IO device interconnect port are provided in the same said IO device interconnect controller.

20. The redundant storage virtualization subsystem of one of claims 17 and 18 wherein a said host-side IO device interconnect port and a said device-side IO device interconnect port are provided in different said IO device interconnect controllers.

21. The redundant storage virtualization subsystem of one of claims 17 and 18, wherein a logical media unit that is presented to said host entity through a first said host-side IO device interconnect port is also redundantly presented through a second said host-side IO device interconnect port.

22. The redundant storage virtualization subsystem of claim 21, wherein the first said host-side IO device interconnect port and the second said host-side IO device interconnect port are IO device interconnect ports of the same one SVC in the redundant SVC pair.

23. The redundant storage virtualization subsystem of claim 21, wherein the first said host-side IO device interconnect port is an IO device interconnect port of one SVC in the redundant SVC pair and the second said host-side IO device interconnect port is an IO device interconnect port of the other SVC in the redundant SVC pair.

24. The redundant storage virtualization subsystem of claim 21, wherein the first said host-side IO device interconnect port and the second said host-side IO device interconnect port are coupled to the same host-side IO device interconnect.

25. The redundant storage virtualization subsystem of claim 24, wherein the first said host-side IO device interconnect port and the second said host-side IO device interconnect port are coupled to the said same host-side IO device interconnect through a switch circuit.

26. The redundant storage virtualization subsystem of claim 21, wherein the first said host-side IO device interconnect port and the second said host-side IO device interconnect port are each coupled to a different host-side IO device interconnect.

27. The redundant storage virtualization subsystem of one of claims 17 and 18, wherein at least one said host-side IO device interconnect port is Fibre Channel supporting point-to-point connectivity in target mode.

28. The redundant storage virtualization subsystem of one of claims 17 and 18, wherein at least one said host-side IO device interconnect port is Fibre Channel supporting public loop connectivity in target mode.

29. The redundant storage virtualization subsystem of one of claims 17 and 18, wherein at least one said host-side IO device interconnect port is Fibre Channel supporting private loop connectivity in target mode.

30. The redundant storage virtualization subsystem of one of claims 17 and 18, wherein at least one said host-side IO device interconnect port is parallel SCSI operating in target mode.

31. The redundant storage virtualization subsystem of one of claims 17 and 18, wherein at least one said host-side IO device interconnect port is ethernet supporting the iSCSI protocol operating in target mode.

32. The redundant storage virtualization subsystem of one of claims 17 and 18, wherein at least one said host-side IO device interconnect port is Serial-Attached SCSI (SAS) operating in target mode.

33. The redundant storage virtualization subsystem of one of claims 17 and 18, wherein at least one said host-side IO device interconnect port is Serial ATA operating in target mode.

34. A redundant storage virtualization subsystem for, providing storage to a host entity, comprising:
- a redundant external storage virtualization controller (SVC) pair for performing IO operations in response to IO requests issued by the host entity comprising a first and a second storage virtualization controller for coupling to the host entity; and
- a set of at least one physical storage device for providing storage to the host entity, with at least one member of said set of at least one physical storage device comprising a PSD coupled to the said redundant storage virtualization controller pair through a point-to-point serial signal interconnect;
- wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and
- wherein an inter-controller communication channel is provided between the two SVCs in said redundant SVC pair for communicating state synchronization information.

35. The redundant storage virtualization subsystem of claim 34 wherein the said point-to-point serial signal interconnect is a Serial ATA IO device interconnect.

36. The redundant storage virtualization subsystem of one of claims 34 and 35, wherein said inter-controller communication channel is an existing IO device interconnect, whereby inter-controller communication exchange is multiplexed with IO requests and associated data.

37. The redundant storage virtualization subsystem of one of claims 34 and 35, wherein said inter-controller communication channel is a dedicated channel the primary function thereof is to exchange said state synchronization information.

38. The redundant storage virtualization subsystem of one of claims 34 and 35, wherein said inter-controller communication channel is Fibre Channel.

39. The redundant storage virtualization subsystem of one of claims 34 and 35, wherein said inter-controller communication channel is Serial ATA.

40. The redundant storage virtualization subsystem of one of claims 34 and 35, wherein said inter-controller communication channel is Parallel SCSI.

41. The redundant storage virtualization subsystem of one of claims 34 and 35, wherein said inter-controller communication channel is Ethernet.

42. The redundant storage virtualization subsystem of one of claims 34 and 35, wherein said inter-controller communication channel is Serial-Attached SCSI (SAS).

43. The redundant storage virtualization subsystem of one of claims 34 and 35, wherein said inter-controller communication channel is I2C.

44. A redundant storage virtualization subsystem for providing storage to a host entity, comprising:
- a redundant external storage virtualization controller (SVC) pair for performing IO operations in response to IO requests issued by the host entity comprising a first and a second storage virtualization controller for coupling to the host entity; and
- a set of at least one physical storage device for providing storage to the host entity, with at least one member of said set of at least one physical storage device comprising a PSD coupled to the said redundant storage virtualization controller pair through a point-to-point serial signal interconnect;
- wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and
- wherein said redundant SVC pair can perform IO request rerouting function.

45. The redundant storage virtualization subsystem of claim 44 wherein the said point-to-point serial signal interconnect is a Serial ATA IO device interconnect.

46. A redundant storage virtualization subsystem for providing storage to a host entity, comprising:
- a redundant external storage virtualization controller (SVC) pair for performing IO operations in response to IO requests issued by the host entity comprising a first and a second storage virtualization controller for coupling to the host entity; and
- a set of at least one physical storage device for providing storage to the host entity, with at least one member of said set of at least one physical storage device comprising a PSD coupled to the said redundant storage virtualization controller pair through a point-to-point serial signal interconnect;
- wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and
- wherein said redundant SVC pair can perform PSD access ownership transfer function.

47. The redundant storage virtualization subsystem of claim 46 wherein the said point-to-point serial signal interconnect is a Serial ATA IO device interconnect.

48. A redundant storage virtualization subsystem for providing storage to a host entity, comprising:
- a redundant external storage virtualization controller (SVC) pair for performing IO operations in response to IO requests issued by the host entity comprising a first and a second storage virtualization controller for coupling to the host entity; and
- a set of at least one physical storage device for providing storage to the host entity, with at least one member of said set of at least one physical storage device comprising a PSD coupled to the said redundant storage virtualization controller pair through a point-to-point serial signal interconnect;
- wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and
- wherein at least one member SVC of said redundant SVC pair includes at least one expansion port for coupling to a second set of at least one PSD through a multiple-device device-side IO device interconnect.

49. The redundant storage virtualization subsystem of claim 48 wherein the said point-to-point serial signal interconnect is a Serial ATA IO device interconnect.

50. The redundant storage virtualization subsystem of one of claims 48 and 49, wherein members of a set of at least one said expansion port are mutually coupled together and to the said second set of at least one PSD through a switch circuit.

51. The redundant storage virtualization subsystem of one of claims 48 and 49, wherein members of a set of at least one said expansion port are mutually coupled together and to the said second set of at least one PSD directly without intervening circuitry.

52. The redundant storage virtualization subsystem of one of claims 48 and 49, wherein a set of at least two said expansion ports form a redundant expansion pert set for mutually performing IO request rerouting function whereby IO requests normally delivered to a PSD through a first member port of said redundant expansion port set may be rerouted through a second member port of said redundant expansion port set.

53. The redundant storage virtualization subsystem of one of claims 48 and 49, wherein a member of said second set of at least one PSD has a pair of redundant ports with a member port of said redundant port pair being coupled to a set of at least one said expansion port.

54. The redundant storage virtualization subsystem of claim 53, wherein IO request rerouting function can be performed through said redundant ports of said member of said second set of at least one PSD whereby IO requests normally delivered to a PSD through a first member port of said redundant port pair may be rerouted to said PSD through a second member port of said redundant port pair.

55. The redundant storage virtualization subsystem of claim 54, wherein a set of at least two said expansion ports form a redundant expansion port set for mutually performing IO request rerouting function whereby IO requests normally delivered to a PSD through a first member port of said redundant expansion port set may be rerouted through a second member port of said redundant expansion port set.

56. The redundant storage virtualization subsystem of claim 53, wherein each member port in the said PSD redundant port pair is coupled to a different set of at least one expansion port.

57. The redundant storage virtualization subsystem of claim 53, wherein said member port of redundant PSD port pair and said set of at least one said expansion port are mutually coupled together through a switch circuit.

58. The redundant storage virtualization subsystem of claim 57, wherein said set of at least one expansion port comprises a first and a second expansion port subset forming a pair of complementary subsets with at least one member expansion port per subset.

59. The redundant storage virtualization subsystem of claim 58, wherein one of the interconnect signal line switching mechanisms implemented by said switch circuit is the coupling of said first subset of the said complementary subset pair to a first member port of said PSD redundant port pair and coupling of said second subset of the said complementary subset pair to a second member port of said PSD redundant port pair.

60. The redundant storage virtualization subsystem of claim 58, wherein one of the interconnect signal line switching mechanisms implemented by said switch circuit is the coupling of both subsets of the said complementary subset pair to a first member port of said PSD redundant port pair.

61. The redundant storage virtualization subsystem of claim 58, wherein one of the interconnect signal line switching mechanisms implemented by said switch circuit is the coupling of said first subset of the said complementary subset pair to a first member port of said PSI) redundant port pair.

62. The redundant storage virtualization subsystem of claim 58, wherein said switch circuit implements an interconnect signal line switching mechanism that supports all of the following arrangements:
  (1) coupling of said first subset of the said complementary subset pair to a first member port of said PSO redundant port pair and coupling of said second subset of the said complementary subset pair to a second member port of said PSD redundant port pair;
  (2) coupling of both subsets of the said complementary subset pair to said first member port of said PSI) redundant port pair;
  (3) coupling of both subsets of the said complementary subset pair to said second member port of said PSO redundant port pair;
  (4) coupling of said first subset of the said complementary subset pair to said first member port of said PSO redundant port pair;
  (5) coupling of said second subset of the said complementary subset pair to said second member port of said PSD redundant port pair;
  (6) coupling of said second subset of the said complementary subset pair to said first member port of said PSD redundant part pair; and,
  (7) coupling of said first subset of the said complementary subset pair to said second member port of said PSD redundant port pair.

63. The redundant storage virtualization subsystem of claim 53, wherein said member port of redundant PSD port pair and said set of at least one said expansion port are directly coupled together without intervening circuitry.

64. The redundant storage virtualization subsystem of claim 53, wherein a member SVC of the redundant SVC pair further comprises at least two said expansion ports forming a redundant expansion port set.

65. The redundant storage virtualization subsystem of claim 64, wherein a first and a second member port in the said redundant expansion port set are each coupled to a different one of member ports in redundant PSD port pair of a member PSD of said second set of at least one PSD.

66. The redundant storage virtualization subsystem of claim 64, wherein a first and a second member port in the said redundant expansion port set are both coupled to the same one of member ports in redundant PSD port pair of a member PSD of said second set of at least one PSD.

67. The redundant storage virtualization subsystem of claim 66, wherein said first and said second member port are directly connected to the same one of member ports in redundant PSD port pair of a member of said second set of at least one PSD without intervening circuitry.

68. The redundant storage virtualization subsystem of claim 53 comprising:
  a first expansion port set comprising at least one said expansion port on the first SVC in the redundant SVC pair;
  a second expansion port set comprising at least one said expansion port on the second SVC in the redundant SVC pair;
  wherein said first expansion port set and said second expansion port set together form a redundant expansion port set pair.

69. The redundant storage virtualization subsystem of claim 68 wherein said first expansion port set and said second expansion port set are each coupled to a different one of member ports in redundant PSD port pair of each PSD of said second set of at least one PSD.

70. The redundant storage virtualization subsystem of claim 68, wherein said first expansion port set and said second expansion port set are both coupled to the same one of member ports in redundant PSD port pair of each PSD of said second set of at least one PSD.

71. The redundant storage virtualization subsystem of one of claims 48 and 49, wherein at least one said expansion port is Fibre Channel.

72. The redundant storage virtualization subsystem of one of claims 48 and 49, wherein at least one said expansion port is Parallel SCSI.

73. The redundant storage virtualization subsystem of one of claims 48 and 49, wherein at least one said expansion port is Serial ATA.

74. The redundant storage virtualization subsystem of one of claims 48 and 49, wherein at least one said expansion port is Ethernet.

75. The redundant storage virtualization subsystem of one of claims 48 and 49, wherein at least one said expansion port is Serial-Attached SCSI (SAS).

76. A redundant storage virtualization subsystem for providing storage to a host entity, comprising:
  a redundant external storage virtualization controller (SVC) pair for performing IO operations in response to IO requests issued by the host entity comprising a first and a second storage virtualization controller for coupling to the host entity; and a set of at least one physical storage device for providing storage to the host entity with at least one member of said set of at least one physical storage device comprising a PSD coupled to the said redundant storage virtualization controller pair through a point-to-point serial signal interconnect;

wherein when one storage virtualization controller in the said redundant SVC pair is not on line or goes off line after being on line, the other storage virtualization controller in the said redundant SVC pair will automatically take over the functionality originally performed by the said one storage virtualization controller in the redundant SVC pair; and wherein in the redundant storage virtualiztion controller pair, each of the storage virtualization controllers further comprises:

a central processing circuitry for performing IO operations in respone to IO request of said host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO devie interconnect controller coupled to at least one physical storage device through said point-to-point serial-signal interconnect; and wherein said PSD is a SATA PSD.

77. The redundant storage virtualization subsystem of claim 76 wherein the said point-to-point serial signal interconnect is a Serial ATA IO device interconnect.

78. A redundant storage virtualization subsystem for providing storage to a host entity, comprising:

a redundant external storage virtualization controller (SVC) pair for performing IO operations in response to IO requests issued by the host entity comprising a first and a second storage virtualization controller for coupling to the host entity; and a set of at least one physical storage device for providing storage to the host entity, with at least one member of said set of at least one physical storage device comprising a PSD coupled to the said redundant storage virtualization controller pair through a point-to-point serial signal interconnect;

wherein when one storage virtualization controller in the said redundant SVC pair is not on line or goes off line after being on line, the other alternate storage virtualization controller in the said redundant SVC pair will automatically take over the functionality originally performed by the said one storage virtualization controller in the redundant SVC pair;

wherein in the redundant storage virtualization controller pair, each of the storage virtualization controllers further comprises:

a central processing circuitry for performing IO operations in response to IO request of said host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller coupled to at least one physical storage device through said point-to-point serial-signal interconnects; and wherein said PSD is a PATA PSD.

79. The redundant storage virtualization subsystem of claim 78 wherein the said point-to-point serial signal interconnect is a Serial ATA IO device interconnect.

80. A redundant storage virtualization subsystem for providing storage to a host entity, comprising:

a redundant external storage virtualization controller (SVC) pair for performing IO operations in response to IO requests issued by the host entity comprising a first and a second storage virtualization controller for coupling to the host entity; and a set of at least one physical storage device for providing storage to the host entity, with at least one member of said set of at least one physical storage device comprising a PSD coupled to the said redundant storage virtualization controller pair through a point-to-point serial signal interconnect;

wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and wherein each SVC in said redundant SVC pair includes a state-defining circuit for forcing externally connected signal lines of alternate SVC in said redundant SVC pair to a predetermined state.

81. The redundant storage virtualization subsystem of claim 80 wherein the said point-to-point serial signal interconnect is a Serial ATA IO device interconnect.

82. A redundant storage virtualization subsystem for providing storage to a host entity, comprising:

a redundant external storage virtualization controller (SVC) pair for performing IO operations in response to IO requests issued by the host entity comprising a first and a second storage virtualization controller for coupling to the host entity; and a set of at least one physical storage device for providing storage to the host entity, with at least one member of said set of at least one physical storage device comprising a PSD coupled to the said redundant storage virtualization controller pair through a point-to-point serial signal interconnect;

wherein when one storage virtualization controller in the said redundant SVC pair is not on line or goes off line after being on line, the alternate storage virtualization controller in the said redundant SVC pair will automatically take over the functionality originally performed by the said one storage virtualization controller in the redundant SVC pair; and wherein each SVC of said redundant SVC pair includes a self-killing circuit for forcing its own externally connected signal lines to a predetermined state.

83. The redundant storage virtualization subsystem of claim 82 wherein the said point-to-point serial signal interconnect is a Serial ATA IO device interconnect.

84. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein a said host-side IO device interconnect port and a said device-side IO device interconnect port are provided in the same said IO device interconnect controller.

85. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein a said host-side IO device interconnect port and a said device-side IO device interconnect port are provided in different said IO device interconnect controllers.

86. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and further comprising a detection mechanism for detecting an off-line or failed state of said alternate storage virtualization controller.

87. The storage virtualization controller of claim 86 wherein the a said at least one device-side IO device interconnect port comprises a Serial ATA interconnect port for connecting to a said physical storage device through a Serial ATA IO device interconnect.

88. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein said SVC includes a state-defining circuit for forcing externally connected signal lines of alternate SVC in said redundant SVC pair to a predetermined state.

89. The storage virtualization controller of claim 88 wherein the a said at least one device-side IO device interconnect port comprises a Serial ATA interconnect port for connecting to a said physical storage device through a Serial ATA IO device interconnect.

90. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein said SVC includes a self-killing circuit for forcing its own externally connected signal lines to a predetermined state.

91. The storage virtualization controller of claim 90 wherein the a said at least one device-side IO device interconnect port comprises a Serial ATA interconnect port for connecting to a said physical storage device through a Serial ATA IO device interconnect.

92. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein said functionality includes presenting and making available to the host entity accessible resources that were originally presented and made available by said alternate storage virtualization controller as well as accessible resources that were presented and made available by said storage virtualization controller itself.

93. The storage virtualization controller of claim 92 wherein the a said at least one device-side IO device interconnect port comprises a Serial ATA interconnect port for connecting to a said physical storage device through a Serial ATA IO device interconnect.

94. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein an access ownership arbitration mechanism is provided to determine which SVC in said SVC pair possesses access ownership.

95. The storage virtualization controller of claim 94 wherein the a said at least one device-side IO device interconnect port comprises a Serial ATA interconnect port for connecting to a said physical storage device through a Serial ATA IO device interconnect.

96. The storage virtualization controller of one of claims 94 and 95, wherein said access ownership arbitration mechanism includes an access ownership detecting mechanism to determine if access ownership is possessed by said SVC.

97. The storage virtualization controller of one of claims 94 and 95, wherein said access ownership arbitration mechanism includes an access ownership granting mechanism to grant access ownership when said access ownership is requested by a said SVC.

98. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and further comprising a cooperating mechanism for the redundant SVC pair to cooperatively control a patching state of an access control switch together with the alternate SVC; a monitoring mechanism for said SVC of said SVC pair to monitor status of the alternate SVC of said SVC pair; and, a state control mechanism for said SVC to forcibly lake complete control of said access control switch independent of the state the alternate SVC of said SVC pair.

99. The storage virtualization controller of claim 98 wherein the a said at least one device-side IO device interconnect port comprises a Serial ATA interconnect port for connecting to a said physical storage device through a Serial ATA IO device interconnect.

100. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein an inter-controller communication port is provided for communicating state synchronization information between the said SVC and the alternate SVC in said redundant SVC pair.

101. The storage virtualization controller of claim 100 wherein the a said at least one device-side IO device interconnect port comprises a Serial ATA interconnect port for connecting to a said physical storage device through a Serial ATA IO device interconnect.

102. The storage virtualization controller of one of claims 100 and 101, wherein said inter-controller communication port is an existing IO device interconnect port, whereby inter-controller communication exchange is multiplexed with IO requests and associated data.

103. The storage virtualization controller of one of claims 100 and 101, wherein said inter-controller communication port is a dedicated port the primary function thereof is to exchange said state synchronization information.

104. The storage virtualization controller of one of claims 100 and 101, wherein said inter-controller communication port is Fibre Channel.

105. The storage virtualization controller of one of claims 100 and 101, wherein said inter-controller communication port is Serial ATA.

106. The storage virtualization controller of one of claims 100 and 101, wherein said inter-controller communication port is Parallel SCSI.

107. The storage virtualization controller of one of claims 100 and 101, wherein said inter-controller communication port is Ethernet.

108. The storage virtualization controller of one of claims 100 and 101, wherein said inter-controller communication port is Serial-Attached SCSI (SAS).

109. The storage virtualization controller of one of claims 100 and 101, wherein said inter-controller communication port is I2C.

110. An external storage virtualization controller for use in a redundant storage virtualization controller pair, comprising:
   a central processing circuitry for performing IO operations in response to IO requests of a host entity;
   at least one IO device interconnect controller coupled to said central processing circuitry;
   at least one host-side IO device interconnect port provided in a said at least one IO device interconnect controller for coupling to said host entity; and
   at least one device-side IO device interconnect port provided in a said at least one IO device interconnect controller for performing point-to-point serial signal transmission with at least one physical storage devices;
   wherein the said external storage virtualization controller will automatically take over the functionality originally performed by the alternate external storage virtualization controller in the said redundant storage virtualization controller pair when said alternate external storage virtualization controller is not on line or goes off line after being on line; and
   wherein said SVC can perform IO request rerouting function.

111. The storage virtualization controller of claim 110 wherein the a said at least one device-side IO device interconnect port comprises a Serial ATA interconnect port for connecting to a said physical storage device through a Serial ATA IO device interconnect.

112. An external storage virtualization controller for use in a redundant storage virtualization controller pair, comprising:
   a central processing circuitry for performing IO operations in response to IO requests of a host entity;
   at least one IO device interconnect controller coupled to said central processing circuitry;
   at least one host-side IO device interconnect port provided in a said at least one IO device interconnect controller for coupling to said host entity; and
   at least one device-side IO device interconnect port provided in a said at least one IO device interconnect controller for performing point-to-point serial signal transmission with at least one physical storage devices;
   wherein the said external storage virtualization controller will automatically take over the functionality originally performed by the alternate external storage virtualization controller in the said redundant storage virtualization controller pair when said alternate external storage virtualization controller is not on line or goes off line after being on line; and
   wherein said SVC can perform PSD access ownership transfer function.

113. The storage virtualization controller of claim 112 wherein the a said at least one device-side IO device interconnect port comprises a Serial ATA interconnect port for connecting to a said physical storage device through a Serial ATA IO device interconnect.

114. An external storage virtualization controller for use in a redundant storage virtualization controller pair, comprising:
   a central processing circuitry for performing IO operations in response to IO requests of a host entity;
   at least one IO device interconnect controller coupled to said central processing circuitry;
   at least one host-side IO device interconnect port provided in a said at least one IO device interconnect controller for coupling to said host entity; and
   at least one device-side IO device interconnect port provided in a said at least one IO device interconnect controller for performing point-to-point serial signal transmission with at least one physical storage devices;
   wherein the said external storage virtualization controller will automatically take over the functionality originally performed by the alternate external storage virtualization controller in the said redundant storage virtualization controller pair when said alternate external storage virtualization controller is not on line or goes off line after being on line; and
   wherein said SVC includes an expansion port for coupling to a second set of at least one PSD through multiple-device device-side IO device interconnects.

115. The storage virtualization controller of claim 114 wherein the a said at least one device-side IO device interconnect port comprises a Serial ATA interconnect port for connecting to a said physical storage device through a Serial ATA IO device interconnect.

116. An external storage virtualization controller for use in a redundant storage virtualization controller pair, comprising:
   a central processing circuitry for performing IO operations in response to IO requests of a host entity;
   at least one IO device interconnect controller coupled to said central processing circuitry;
   at least one host-side IO device interconnect port provided in a said at least one IO device interconnect controller for coupling to said host entity; and
   at least one device-side IO device interconnect port provided in a said at least one IO device interconnect controller for performing point-to-point serial signal transmission with at least one physical storage devices;
   wherein the said external storage virtualization controller will automatically take over the functionality originally performed by the alternate external storage virtualization controller in the said redundant storage virtualization controller pair when said alternate external storage virtualization controller is not on line or goes off line after being on line; and
   wherein at least one said host-side IO device interconnect part is Fibre Channel supporting point-to-point connectivity in target mode.

117. The storage virtualization controller of claim 116 wherein the a said at least one device-side IO device interconnect port comprises a Serial ATA interconnect port for connecting to a said physical storage device through a Serial ATA IO device interconnect.

118. An external storage virtualization controller for use in a redundant storage virtualization controller pair, comprising:
a central processing circuitry for performing IO operations in response to IO requests of a host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for performing point-to-point serial signal transmission with at least one physical storage devices;
wherein the said external storage virtualization controller will automatically take over the functionality originally performed by the alternate external storage virtualization controller in the said redundant storage virtualization controller pair when said alternate external storage virtualization controller is not on line or goes off line after being on line; and
wherein at least one said host-side IO device interconnect port is Fibre Channel supporting public loop connectivity in target mode.

119. The storage virtualization controller of claim 118 wherein the a said at least one device-side IO device interconnect port comprises a Serial ATA interconnect port for connecting to a said physical storage device through a Serial ATA IO device interconnect.

120. An external storage virtualization controller for use in a redundant storage virtualization controller pair, comprising:
a central processing circuitry for performing IO operations in response to IO requests of a host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for performing point-to-point serial signal transmission with at least one physical storage devices;
wherein the said external storage virtualization controller will automatically take over the functionality originally performed by the alternate external storage virtualization controller in the said redundant storage virtualization controller pair when said alternate external storage virtualization controller is not on line or goes off line after being on line; and
wherein at least. one said host-side IO device interconnect port is Fibre Channel supporting private loop connectivity in target mode.

121. The storage virtualization controller of claim 120 wherein the a said at least one device-side IO device interconnect port comprises a Serial ATA interconnect port for connecting to a said physical storage device through a Serial ATA IO device interconnect.

122. An external storage virtualization controller for use in a redundant storage virtualization controller pair, comprising:
a central processing circuitry for performing IO operations in response to IO requests of a host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for performing point-to-point serial signal transmission with at least one physical storage devices;
wherein the said external storage virtualization controller will automatically take over the functionality originally performed by the alternate external storage virtualization controller in the said redundant storage virtualization controller pair when said alternate external storage virtualization controller is not on line or goes off line after being on line; and
wherein at least one said host-side IO device interconnect port is parallel SCSI operating in target mode.

123. The storage virtualization controller of claim 122 wherein the a said at least one device-side. IO device interconnect port comprises a Serial ATA interconnect port for connecting to a said physical storage device through a Serial ATA IO device interconnect.

124. An external storage virtualization controller for use in a redundant storage virtualization controller pair, comprising:
a central processing circuitry for performing IO operations in response to IO requests of a host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for performing point-to-point serial signal transmission with at least one physical storage devices;
wherein the said external storage virtualization controller will automatically take over the functionality originally performed by the alternate external storage virtualization controller in the said redundant storage virtualization controller pair when said alternate external storage virtualization controller is not on line or goes off line after being on line; and
wherein at least one said host-side IO device interconnect port is ethernet supporting the iSCSI protocol operating in target mode.

125. The storage virtualization controller of claim 124 wherein the a said at least one device-side IO device interconnect port comprises a Serial ATA interconnect port for connecting to a said physical storage device through a Serial ATA IO device interconnect.

126. An external storage virtualization controller for use in a redundant storage virtualization controller pair, comprising:
a central processing circuitry for performing IO operations in response to IO requests of a host entity;
at least one IO device interconnect controller coupled to said central processing circuitry;
at least one host-side IO device interconnect port provided in a said at least one IO device interconnect controller for coupling to said host entity; and
at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein at least one said host-side IO device interconnect port is Serial-Attached SCSI (SAS) operating in target mode.

127. The storage virtualization controller of claim 126 wherein the a said at least one device-side IO device interconnect port comprises a Serial ATA interconnect port for connecting to a said physical storage device through a Serial ATA IO device interconnect.

128. An external storage virtualization controller for use in a redundant storage virtualization controller pair, comprising:

a central processing circuitry for performing IO operations in response to IO requests of a host entity;

at least one IO device interconnect controller coupled to said central processing circuitry;

at least one host-side IO device interconnect port provided in a said at least one IO device interconnect controller for coupling to said host entity; and at least one device-side IO device interconnect port provided in a said at least one IO device interconnect controller for performing point-to-point serial signal transmission with at least one physical storage devices;

wherein the said external storage virtualization controller will automatically take over the functionality originally performed by the alternate external storage virtualization controller in the said redundant storage virtualization controller pair when said alternate external storage virtualization controller is not on line or goes off line after being on line; and wherein at least one said host-side IO device interconnect port is Serial ATA operating in target mode.

129. The storage virtualization controller of claim 128 wherein the a said at least one device-side IO device interconnect port comprises a Serial ATA interconnect port for connecting to a said physical storage device through a Serial ATA IO device interconnect.

* * * * *